(12) United States Patent
Abe

(10) Patent No.: US 9,720,922 B2
(45) Date of Patent: Aug. 1, 2017

(54) RECORDING MEDIUM AND METHOD FOR FILE ACCESS

(71) Applicant: SOCIONEXT INC., Yokohama-shi, Kanagawa (JP)

(72) Inventor: Naoki Abe, Yokohama (JP)

(73) Assignee: SOCIONEXT INC., Yokohama (JP)

( * ) Notice: Subject to any disclaimer, the term of this patent is extended or adjusted under 35 U.S.C. 154(b) by 304 days.

(21) Appl. No.: 14/555,908

(22) Filed: Nov. 28, 2014

(65) Prior Publication Data

US 2015/0178311 A1 Jun. 25, 2015

(30) Foreign Application Priority Data

Dec. 24, 2013 (JP) ................... 2013-265110

(51) Int. Cl.
*G06F 17/30* (2006.01)

(52) U.S. Cl.
CPC .............. *G06F 17/30091* (2013.01)

(58) Field of Classification Search
CPC ............... G06F 17/30; G06F 17/30091; G06F 17/30203; G06F 17/30637
USPC .................................. 707/600–899
See application file for complete search history.

(56) References Cited

U.S. PATENT DOCUMENTS

| | | | |
|---|---|---|---|
| 2005/0152251 A1 | 7/2005 | Harumatsu | |
| 2006/0225084 A1 | 10/2006 | Fontijn | |
| 2007/0136549 A1* | 6/2007 | Kawamura | G06F 13/387 711/170 |
| 2009/0055351 A1 | 2/2009 | Whitehorn et al. | |
| 2010/0180091 A1 | 7/2010 | Hahn et al. | |

FOREIGN PATENT DOCUMENTS

| | | |
|---|---|---|
| JP | 2003-30969 | 1/2003 |
| JP | 2003-140945 | 5/2003 |
| JP | 2004-13276 | 1/2004 |
| JP | 2004-30232 | 1/2004 |
| JP | 2004-294187 | 10/2004 |
| JP | 2005-38383 | 2/2005 |
| JP | 2005-222525 | 8/2005 |

(Continued)

OTHER PUBLICATIONS

Japanese Office Action dated Mar. 28, 2017 in corresponding Japanese Patent Application No. 2013-265110.

*Primary Examiner* — Isaac M Woo
(74) *Attorney, Agent, or Firm* — Staas & Halsey LLP

(57) ABSTRACT

A method for file access includes accessing, by a processor, a file which is divided and stored in data area including a plurality of access units on the base of an access unit management table, the accessing including using a first table included in the access unit management table, the first table including a first management information corresponding to a first access unit and indicating that the first access unit and a second access unit following the first access unit in chains are located in continuous addresses and a second management information corresponding to the first access unit and indicating that the first access unit and the second access unit are located in discontinuous addresses, and using a second table included in the access unit management table, the second table including access unit identification information of the first and the second access units which are located in the discontinuous addresses.

18 Claims, 21 Drawing Sheets

(56) References Cited

FOREIGN PATENT DOCUMENTS

| JP | 2006-146466 | 6/2006 |
|----|-------------|--------|
| JP | 2006-524405 | 10/2006 |
| JP | 2007-265010 | 10/2007 |
| JP | 2008-269520 | 11/2008 |
| JP | 2010-537322 | 12/2010 |
| JP | 2012-174033 | 9/2012 |
| JP | 2012-520507 | 9/2012 |

* cited by examiner

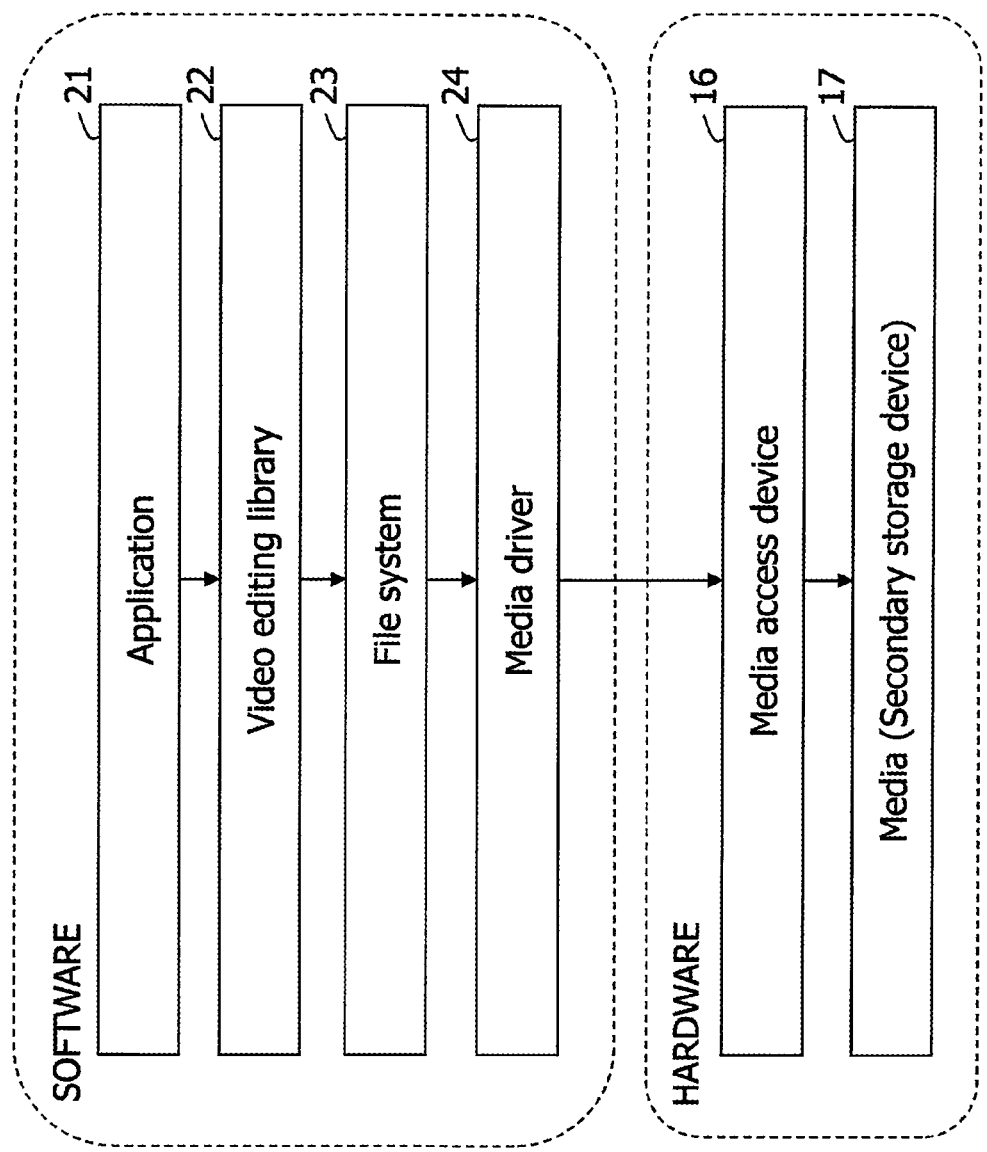

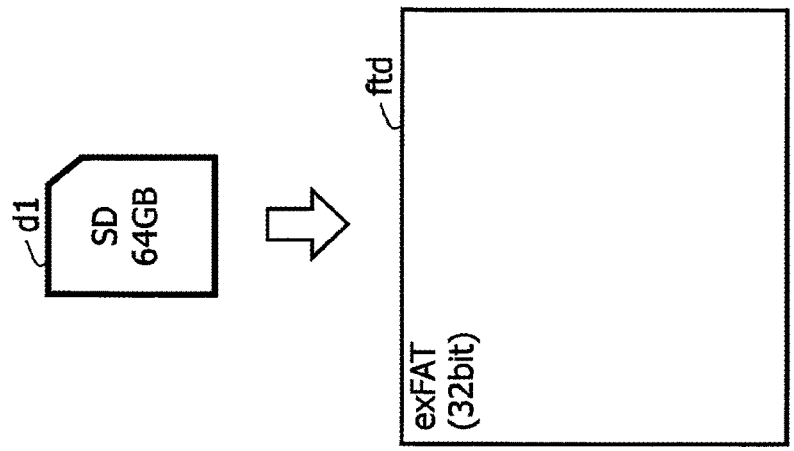
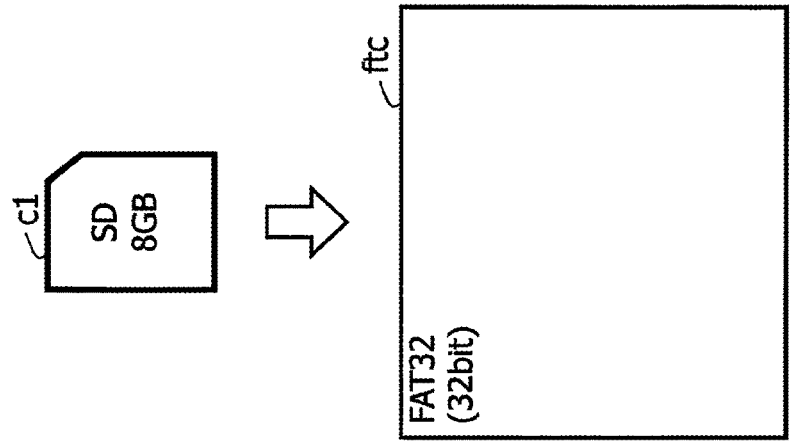
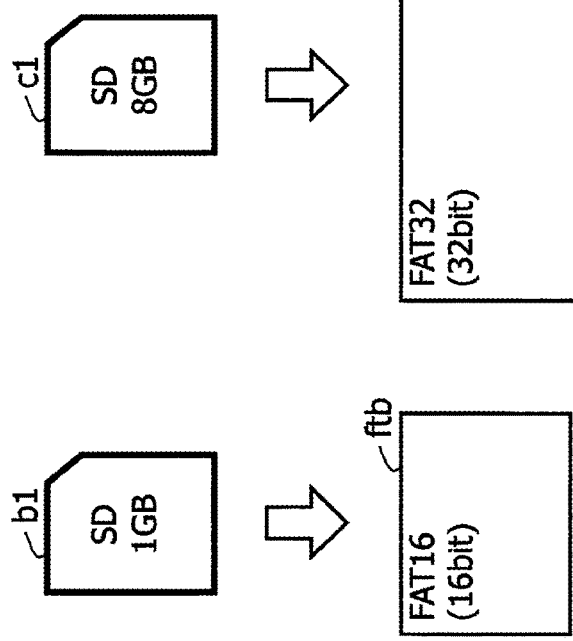
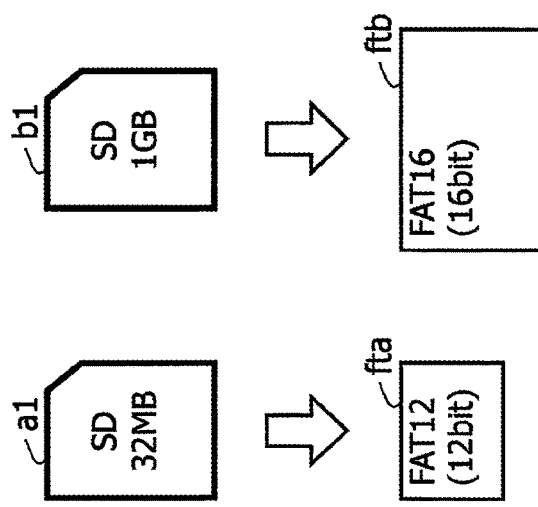

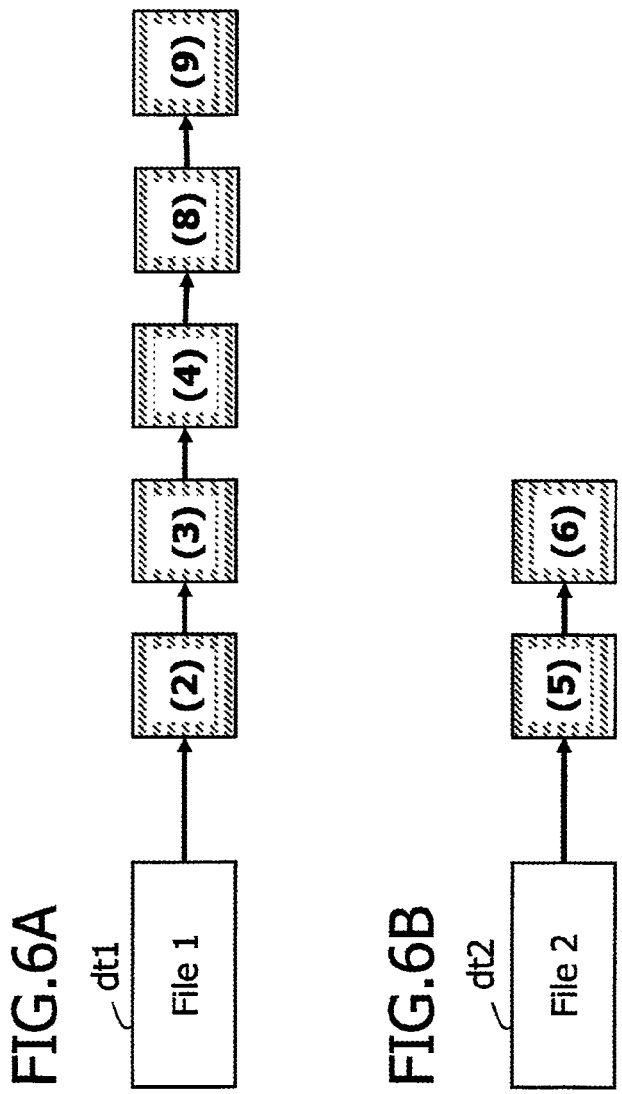

FIG.7A ftc

| Address | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0x0000 | (Reserved) | | | | 0x00000006 | | | | 0x00000003 | | | | 0x00000004 | | | |
| 0x0010 | 0x00000008 | | | | 0xFFFFFFFF | | | | 0xFFFFFFFF | | | | 0x00000000 | | | |
| 0x0020 | 0x00000009 | | | | 0xFFFFFFFF | | | | 0x00000000 | | | | 0x00000000 | | | |

FIG.7B ftb

| Address | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0x0000 | (Reserved) | | 0xFFFF | | 0x0003 | | 0x0004 | | 0x0008 | | 0x0006 | | 0xFFFF | | 0xFFFF | |
| 0x0010 | 0x0009 | | 0x0000 | | 0x0000 | | 0x0000 | | 0x0000 | | 0x0000 | | 0x0000 | | 0x0000 | |
| 0x0020 | 0x0000 | | 0x0000 | | 0x0000 | | 0x0000 | | 0x0000 | | 0x0000 | | 0x0000 | | 0x0000 | |

FIG.7C fta

| Address | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0x0000 | (Reserved) | (Reserved) | 0x003 | 0x003 | 0x004 | 0x004 | 0x008 | 0x008 | 0x006 | 0xFFF | 0x000 | 0x000 | 0x009 | 0xFFF | 0xFFF | 0x000 |
| 0x0010 | 0x000 | 0x000 | 0x000 | 0x000 | 0x000 | 0x000 | 0x000 | 0x000 | 0x000 | 0x000 | 0x000 | 0x000 | 0x000 | 0x000 | 0x000 | 0x000 |
| 0x0020 | 0x000 | 0x000 | 0x000 | 0x000 | 0x000 | 0x000 | 0x000 | 0x000 | 0x000 | 0x000 | 0x000 | 0x000 | 0x000 | 0x000 | 0x000 | 0x000 |

FIG.8A t1 e0 e2 e4 e6 e8
  e1 e3 e5 e7 e9

| Address | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0x0000 |   |   |   |   |   |   |   |   |   |   |   |   |   |   |   |   |
| 0x0010 |   |   |   |   |   |   |   |   |   |   |   |   |   |   |   |   |
| 0x0020 |   |   |   |   |   |   |   |   |   |   |   |   |   |   |   |   |

☐ 00 : space  ▨ 01 : end  ▥ 10 : continuation  ▦ 11 : other

FIG.8B
t2

| Own cluster number | Next cluster number |
|---|---|
| 1 | 0x00000004 | 0x00000008 |
| 2 |  |  |
| 3 |  |  |
| 4 |  |  |

RECORDING MEDIUM AND METHOD FOR FILE ACCESS

CROSS-REFERENCE TO RELATED APPLICATION

This application is based upon and claims the benefit of priority of the prior Japanese Patent Application No. 2013-265110, filed on Dec. 24, 2013, the entire contents of which are incorporated herein by reference.

FIELD

The embodiments discussed herein are related to a method for file access and a computer-readable non-transitory tangible recording medium having stored therein a program for causing a computer to execute a file access process.

BACKGROUND

File system of FAT (File Allocation Tables) format store file data into a plurality of clusters which are divided, and manages the data of the file based on chain information between the clusters. The file system of the FAT format uses a boot sector area, a FAT area, and a file/directory area.

The boot sector area has information of the entire storage medium (capacity and cluster size of the storage medium, etc.). The file/directory area has data of the directory entry and the file. The file/directory area is divided into a cluster which is a unit area, and is managed. The directory entry includes information about the file name and the file size, etc. Further, the FAT area has the chain information of the clusters which constitute the data of the file.

Specially, the FAT area has FAT entry having management information of the cluster to every cluster. When there is a following data of a cluster to one data, the management information indicates an ID (Identification) number of the cluster that following data is memorized. In addition, when there is not the following data of the cluster, the management information indicates an EOC (End Of Cluster) and indicates the value indicating a space when the data is not memorized in corresponding cluster. In addition, the management information indicates a defective cluster when the corresponding cluster is a defective cluster.

In addition, in the FAT formats, there is the type such as FAT12 format, FAT16 format, FAT32 format, and exFAT (Extended FAT) format, for example. Depending on the type of the FAT format, the size of the FAT entry is different. For example, the size of the FAT entry of the FAT12 format is a 12 bit, and the size of the FAT entry of the FAT16 format is a 16 bit. In addition, the sizes of the FAT entries of the FAT32 format and the exFAT format are 32 bit.

Accordingly, the controllable maximum size of the recording medium grows big by increasing the number of the controllable clusters according to an expansion of the size of the FAT entry. For example, it is possible that the file system of the FAT32 format manages the recording medium which has bigger file than that of the file system of the FAT16 format.

[patent document 1] Japanese Laid-open Patent publication No. 2003-030969.
[patent document 2] Japanese Laid-open Patent publication No. 2004-013276.

SUMMARY

According to a first aspect of the embodiment, a method for file access includes, accessing, by a processor, a file which is divided and stored in data area including a plurality of access units on the base of an access unit management table having a chain information of the access units, the accessing including, using a first table included in the access unit management table, the first table including a first management information corresponding to a first access unit and indicating that the first access unit and a second access unit following the first access unit in chains are located in continuous addresses in the data area and a second management information corresponding to the first access unit and indicating that the first access unit and the second access unit are located in discontinuous addresses, and using a second table included in the access unit management table, the second table including access unit identification information of the first and the second access units which are located in the discontinuous addresses.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram explaining an example of the constitution of the software in the file access device according to the embodiment.

FIG. 4A-FIG. 4D are diagrams explaining a summary of the type of the file system of the FAT format.

FIG. 6A and FIG. 6B are diagrams exemplifying the chain state of a cluster which constitutes data dt1 and dt2 of two files (file 1 and file 2) in the specific example.

FIG. 7A, FIG. 7B and FIG. 7C are diagrams indicating each FAT ft of the FAT12 format, the FAT16 format and the FAT32 format according to a comparative example.

FIG. 8A and FIG. 8B are diagrams explaining a specific example of the FAT2 t1 and the discontinuous clusters list t2 according to the embodiment.

DESCRIPTION OF EMBODIMENTS

Because a file access program is needed to correspond to the type of all FAT formats, the access process of the file becomes complicated, and the maintenance man-hours of the program increase. In addition, whole size of the FAT grows big with the expansion of the size of the FAT entry. Therefore, when the file access program reads the FAT entry to a cache memory and accesses the recording medium, the ratio of FAT entry, in which the cache memory holds, decreases and the cash hit rate of the FAT entry decreases. Therefore, the search efficiency of the cluster decreases, and the access efficiency of the file decreases.

(Constitution of the File Access Device)

Figure 1:
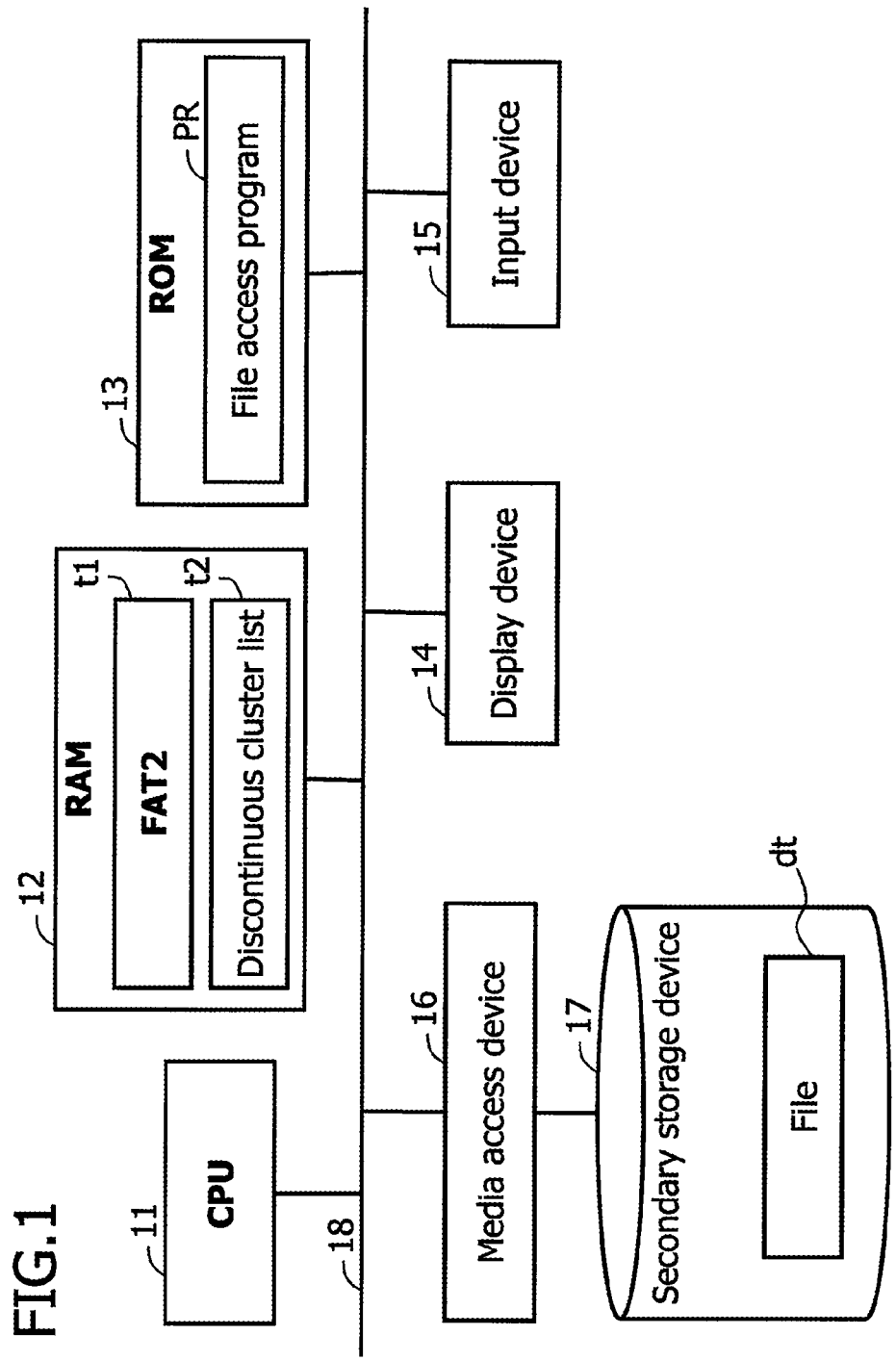
FIG. 1 is a diagram explaining an example of a constitution of the file access device according to the embodiment.

FIG. 1 is a diagram explaining an example of a constitution of the file access device according to the embodiment. The file access device depicted by FIG. 1 has a CPU (Central Processing Unit) 11, a RAM (Random Access Memory) 12, a ROM (Read Only Memory) 13, a display device 14, an input device 15, a media access device 16, a secondary storage device 17. The all elements are connected through a bus 18 mutually. The display device 14 is, for example, a monitor device, and the input device 15 is a keyboard and a mouse. The media access device 16 is a device controlling access to the secondary storage device 17. For example, the ROM 13 stores the file access program PR according to the embodiment. The file access program PR realizes the file access processing in the embodiment by collaborating with CPU 11.

In addition, for example, in the embodiment, the RAM 12 has a cache memory and the cache memory stores a FAT2 (File Allocation Table) t1 and a list of discontinuous cluster t2. The details of the FAT2 t1 and the list of discontinuous clusters t2 will be explained later. For example, the secondary storage device 17 is a storage media such as a SD (Super Disk or Secure Digital) memory card or a hard disk. The file dt, which is stored into the secondary storage device 17, is stored based on the file system of the FAT format corresponding to the secondary storage device 17.

(Constitution of Software)

FIG. 2 is a diagram explaining an example of the constitution of the software in the file access device according to the embodiment. In FIG. 2, same elements as depicted by FIG. 1 are represented by same reference signs. Each software is stored in the ROM 13 (referring to FIG. 1) in the file access device, for example.

The software illustrated in FIG. 2 has an application program 21, video editing library 22, a file system software program 23, and a media driver program 24. The file access program PR (referring to FIG. 1) according to the embodiment is some programs of the file system software program 23. In addition, the hardware illustrated in FIG. 2 has the media access device 16 (referring to FIG. 1) and the media (secondary storage device) 17 (referring to FIG. 1).

The application program 21, which performs video editing, when accepting the operation by the user, generates an instruction information corresponding to the operation of the user and notifies it to the video editing library 22. For example, the instruction information is information to instruct an insertion process of data, a deletion process of data, a movement process of the data between the file for the file stored in the secondary storage device 17. And the video editing library 22 converts the instruction information to match with an interface of file system software 23 and notifies it to the file system software 23. The file system software 23 accesses the file dt in the secondary storage device 17 through the media driver 24 based on the instruction information notified.

The media access device 16 performs the control for data in the file dt stored in the secondary storage device 17 based on an instruction input from the media driver 24. In the embodiment, the secondary storage device 17 is formatted based on the FAT format as mentioned above.

Then, a summary of the file system of the FAT format will be explained.

(File System of the FAT Format)

Figure 3A:
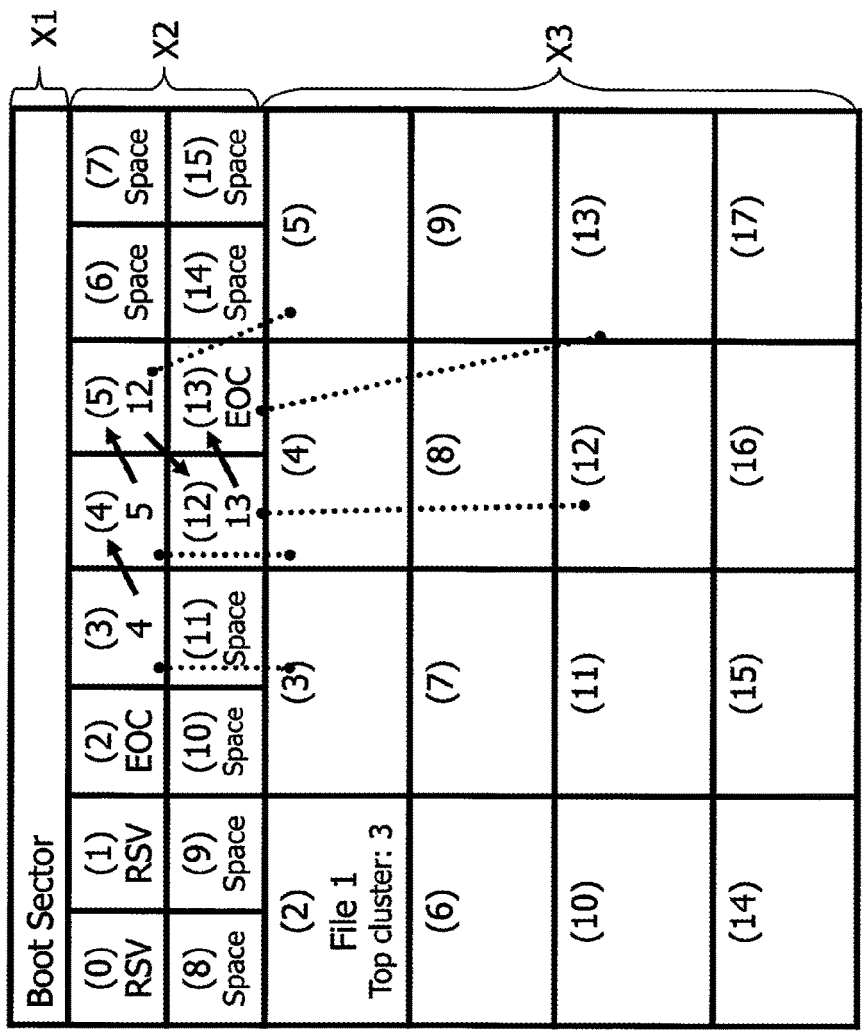
FIG. 3A and FIG. 3B are diagrams of example explaining a summary of the file system of the FAT format.
Figure 3B:
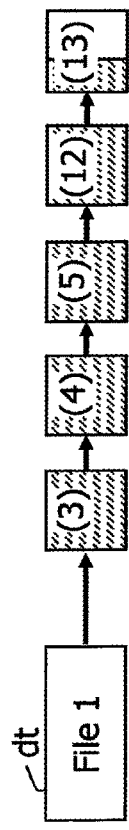

FIG. 3A and FIG. 3B are diagrams of example explaining a summary of the file system of the FAT format. As illustrated by FIG. 3A, the file system of the FAT format is constructed based on three areas such as the boot sector area X1, the FAT area X2, and the file/directory area X3. The boot sector area X1 has information about the secondary storage device 17 such as the capacity and unit size of the cluster of the secondary storage device 17. For example, the boot sector area X1 is managed based on a sector unit of 512 bytes.

The file/directory area X3 has the file information called as the directory entry and the data of the file. The file/directory area X3 is managed to a cluster unit one size bigger than the sector (nth power of the size of the sector size). For example, the directory entry has the file information such as a file name, an extension, a file size and the number of the top cluster that data is stored for each file.

The FAT area X2 has the FAT entry having management information corresponding to each cluster in the file/directory domain X3. When data is stored in corresponding cluster and the cluster (data) has following data, the management information indicates the cluster number of the cluster that the following data are stored. In addition, when the data are stored in a corresponding cluster and the cluster (data) has not following data, the management information indicates end (EOC: End Of Cluster). In addition, the management information, when the data is not stored in the corresponding cluster, indicates a space, and the management information, when a corresponding cluster is defected, indicates a defective cluster. In addition, the value indicating the reservation area is stored in zero-th and first FAT entries.

The directory entry has the cluster number of top cluster storing away the first data of the file as I mentioned above. And the FAT entry of the top cluster has the cluster number of the cluster to chain next. In other words, FAT domain X2 has the chain reaction information of a cluster constituting the data of the file.

FIG. 3B illustrates a diagram exemplifying the chain structure of a cluster constituting data of the file dt (in this example, the file 1). In FIG. 3B, the square block indicates a cluster, and the number described within the square block indicates a cluster number. As illustrated in FIG. 3B, the data of file 1 dt is stored the cluster 4, cluster 5, cluster 12 and cluster 13 sequentially as the top to the cluster of number three (called as the cluster 3). Therefore, the directory entry of the file/directory area X3 illustrated in FIG. 3 has the information that the top cluster of the file 1 is the cluster 3. In addition, the FAT entry of the cluster number 3 in the FAT area X2 has cluster number "4", and the FAT entry of the cluster number 4 has cluster number "5". And the FAT entry of cluster number 13 has a value indicating the information "end (EOC)" which indicates a cluster of the tail.

In addition, in the file system of the FAT format illustrated in FIG. 3, there is the type such as FAT 12 format, FAT 16 format, FAT 32 format, the exFAT format, for example. The size of the FAT entry is different depending on the type of the FAT format. Here, a summary of the type of the file system of the FAT format will be explained.

(Type of the File System of the FAT Format)

FIG. 4A~FIG. 4D are diagrams explaining a summary of the type of the file system of the FAT format. FIG. 4A-FIG. 4D exemplify combinations of the SD card a1-d1 adopting the file systems of FAT 12 format, FAT 16 format, FAT 32 format and exFAT format, and FAT fta-ftd (referring to FIG. 3) in the FAT area X2.

The FAT fta depicted by FIG. 4A is the FAT in the file system of the FAT 12 format. The size of each FAT entry of which the FAT fta has is 12 bit. In the file system of the FAT 12 format, the number of the upper limit of a controllable cluster correspond to the number that is able to express in 12 bit. For example, the maximum size of the capacity, in which the storage medium based on the standard of the file system of the FAT 12 format is controllable, is 64 MB (Mega Bit). Therefore, the SD card a1 of the capacity 32 MB is formatted by the file system of the FAT 12 format.

The FAT ftb depicted by FIG. 4B is the FAT in the file system of the FAT 16 format. The size of each FAT entry of which the FAT ftb has is 16 bit. In the file system of the FAT 16 format, for example, the maximum size of the capacity, in which the storage medium based on the standard of the file system of the FAT 16 format is controllable, is 2 GB (Giga Bit). Therefore, the SD card b1 of the capacity 1 GB is formatted by the file system of the FAT 16 format.

In addition, the FAT ftc depicted by FIG. 4C is the FAT in the file system of the FAT 32 format. The size of each FAT entry of which the FAT ftc has is 32 bit. The maximum size of the capacity, in which the storage medium based on the standard of the file system of the FAT 32 format (for example, SDHC: SD High-Capacity) is controllable, is 32 GB (Giga Bit). Therefore, the SD card c1 of the capacity 8 GB is formatted by the file system of the FAT 32 format. As same as, the size of each FAT entry, of which the FAT ftd in the file system of the exFAT format depicted by FIG. 4D has, is 32 bit. The maximum size of the capacity, in which the storage medium based on the standard of the file system of the exFAT format (for example, SDXC: SD eXtended Capacity) is controllable, is 2 TB (Tera Bit). Therefore, the SD card d1 of the capacity 64 GB is formatted by the file system of the exFAT format.

As represented by FIG. 4A-FIG. 4D, with expansion of the size of the FAT entry, the maximum size of a controllable capacity in the file system increases. On the other hand, the sizes of FAT fta-ftd also increase with the expansion of the size of the FAT entry. When reading a part of the FAT fta-ftd to the cache memories such as the RAM 12 and accessing the file, with the expansion of the size of the FAT entry, the ratio of FAT entry, in which the cache memory is able to store, decreases, thereby cash hit rate decreases. Therefore, the search efficiency of the cluster decreases, and the access efficiency of the file may decrease.

(First Embodiment)

Therefore, the file access processing according to the embodiment accesses the file, which is divided into clusters and stored, based on a cluster management table having the chain information of the cluster. The cluster management table includes a FAT table (a first table) t1 having the first management information corresponding to the first cluster when the first cluster and the following second cluster chaining to the first cluster are located in the continuing addresses in the data region and the second management information corresponding to the first cluster when the first cluster and the second cluster are located in the discontinuing addresses, and a discontinuity cluster list (a second table) t2 having the cluster identification information of the first and second clusters which are located in the discontinuing addresses.

In other words, the file access program PR according to the embodiment accesses a cluster of the file/directory area X3 (referring to FIG. 3) based on the FAT2 of common to a plurality type of FAT format, which is generated based on each FAT ft of the file system of the FAT format, and the discontinuity cluster list t2. Thereby, it is possible that the file access program according to the embodiment performs a file access based on the common processing regardless of a kind of FAT ft of the file system. In addition, because the size of each FAT entry of FAT2 t1 is small, it is possible to increase the ratio of FAT entry of which the cache memory holds and to improve the search efficiency of the cluster.

Figure 5:
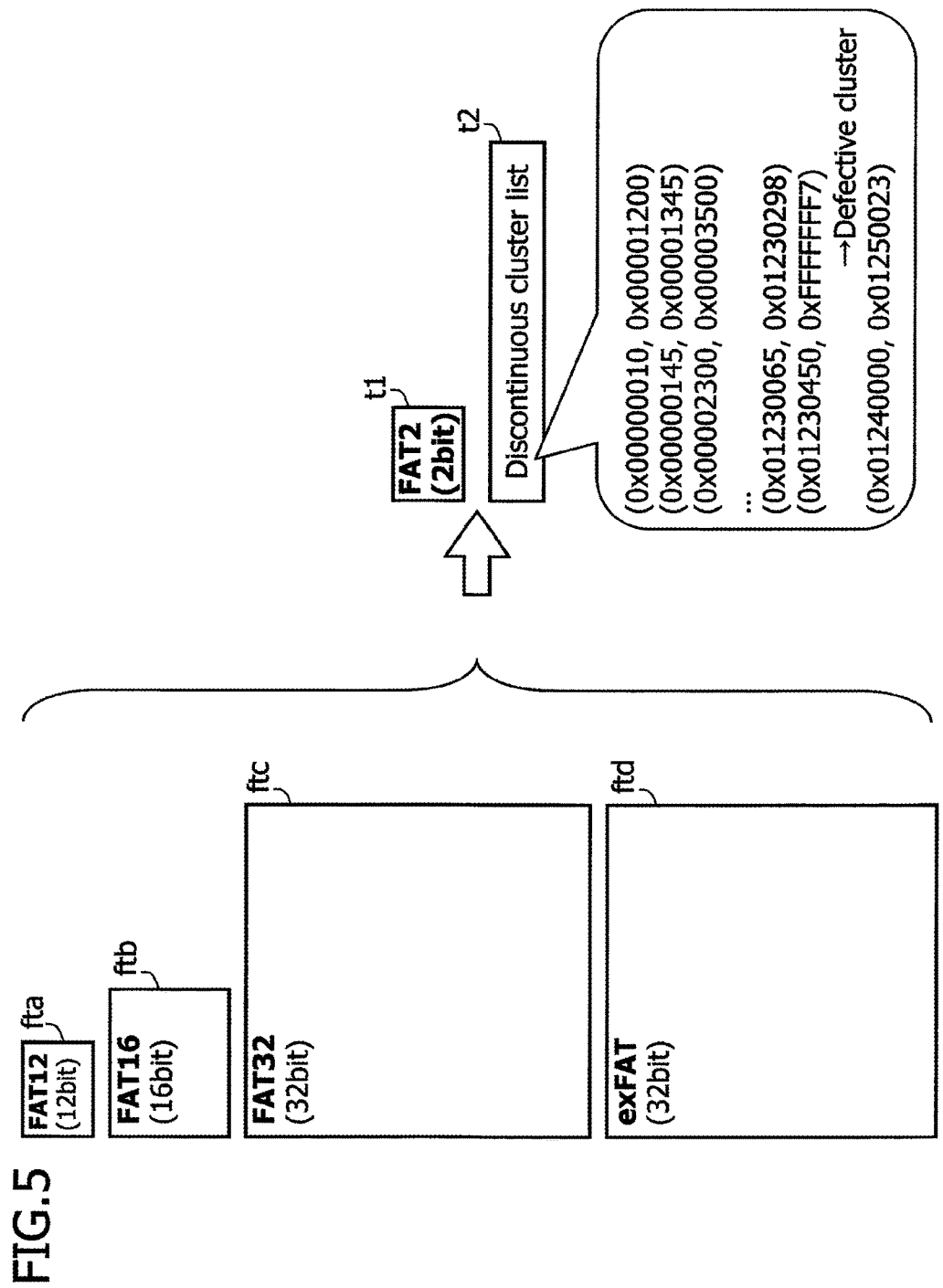
FIG. 5 is a diagram explaining a summary of the FAT2 t1 and the list of discontinuous clusters t2.

FIG. 5 is a diagram explaining a summary of the FAT2 t1 and the list of discontinuous clusters t2. In FIG. 5, same elements as depicted by FIG. 4A-FIG. 4D are represented by same reference signs. For example, the FAT2 t1 and the list of discontinuous clusters t2 are created based on the FAT ft of the FAT format corresponding to the secondary storage device 17, for example.

Each FAT entry of the FAT2 t1 according to the embodiment has the management information of 2 bit for each cluster, for example. For example, the management information of 2 bit includes first management information of "continuation" and second management information of "others (discontinuous)". The first management information of "continuation" indicates that following data to the data stored to a corresponding cluster is stored in the cluster which is located in the consecutive address of the file/directory area X3 (referring to FIG. 3). In addition, the second management information of "others" (discontinuous) indicates that following data to the data stored to a corresponding cluster is stored in the cluster which is located in the discontinuous address of the file/directory area X3.

In addition, the list of discontinuous clusters t2 has the cluster number of the following cluster in the chain information corresponding to the cluster number of the cluster about a cluster having the second management information of "others" (discontinuous). For example, the list of discontinuous clusters t2 in the example in FIG. 5 has information "0x00000010, 0x00001200". This information indicates that a following data with the data, which is stored in the cluster of cluster number 16 (below, the cluster 16 and expressed by a hexadecimal by "0x00000010"), is stored in the cluster of cluster number 4608 (below, the cluster 4608 and expressed by hexadecimal by "0x00001200").

In addition, the management information of 2 bit further includes management information "EOC" and "space". The management information "EOC" indicates that the data stored to a corresponding cluster is data of the tail of the file.

The management information "space" indicates that the data is not stored to a corresponding cluster. In addition, the second management information "others" (discontinuous) may be appointed to the FAT entry corresponding to the cluster when the corresponding cluster is a defective cluster. The List of discontinuous clusters t2 has the information "0xFFFFFFF7" indicating the defective cluster corresponding to the cluster number of the cluster, about a cluster having the second management information "others" (discontinuous). For example, the list of discontinuous clusters t2 in the example of FIG. 5 has information "0x01230450, 0xFFFFFFF7". This information indicates that the cluster 19072080 (expressed by hexadecimal "0x01230450") is a defective cluster.

In addition, the management information is not limited to this example. That is, the management information "others" (discontinuous) may be appointed to the FAT entry corresponding to the cluster when the corresponding cluster indicates the state except the defective cluster. In this case, the list of discontinuous clusters t2 has condition information indicating the state of the cluster concerned corresponding to the cluster number of the cluster, about a cluster having the second management information "others" (discontinuous).

The file access program PR according to the embodiment accesses a cluster of the file/directory area X3 in the file system of the FAT format with reference to the FAT2 t1 and the discontinuous cluster list t2 as depicted by FIG. 5, in substitution for FAT ft. It is possible that the file access program PR according to the embodiment, compresses the FAT ft of each kind of the FAT format into the FAT2 t1 having the FAT entry of 2 bit by using the list of discontinuous clusters t2.

The data in a file made newly are often stored to clusters successive located in the file/directory area X3 (referring to FIG. 3). Therefore, the appearance frequency of the cluster, in which the corresponding FAT entry has the first management information "continuation", is high. In the file system of the FAT format, the address of the cluster corresponding to the FAT entry is decided depending on the FAT entry uniquely. Therefore, the FAT entry does not have to hold the cluster number of the follower cluster when the addresses of the corresponding cluster and the following cluster continue.

In addition, the list of discontinuous clusters t2 has the cluster number of the follower cluster of the cluster, of which the corresponding FAT entry has management information of "others (discontinuous)", or the state information of the cluster (information which is a defective cluster). Because the FAT entry of FAT2 t1 does not have to hold a cluster number, it is sufficient that the FAT entry has a domain of 2 bit. In addition, the appearance frequency of the cluster, in which the corresponding FAT has the management information of "others (discontinuous)", is low. Therefore, the quantity of data of the list of discontinuous clusters t2 is held down, and the frequency to refer to the list of discontinuous clusters t2 is low.

In addition, in an example of FIG. 5, the size of the cluster number that the list of discontinuous clusters t2 has is 32 bit. The size of the cluster number that the list of discontinuous cluster t2 according to the embodiment has, corresponds with the biggest size among the sizes of the FAT entry of all FAT formats which correspond with. Thereby, it is possible that the file access program PR converts the FAT ft into the FAT2 t1 and the discontinuous cluster list t2 even if using either FAT format. But, it is not limited to this example. That is, the file access program PR may generate discontinuation cluster list t2 for every type of the FAT format.

The FAT ft in the file system of the FAT 12 format, the FAT 16 format and the FAT 32 format, and the FAT2 ft and the discontinuation cluster list t2 according to the embodiment, will be explained based on a specific example.

FIG. 6A and FIG. 6B are diagrams exemplifying the chain state of a cluster which constitutes data dt1 and dt2 of two files (file 1 and file 2) in the specific example. In an example of FIG. 6A, the data of file 1 dt1 are stored in order of the cluster 2 as top, the cluster 3, the cluster 4, the cluster 8 and the cluster 9. In addition, in the example of FIG. 6B, the data of file 2 dt2 are stored in order of the cluster 5 as top and the cluster 6. In other words, the cluster 2 and the cluster 3, the cluster 3 and the cluster 4, the cluster 5 and the cluster 6, and the cluster 8 and the cluster 9 are located in the consecutive address in the file/directory domain X3 (referring to FIG. 3). On the other hand, the cluster 4 and the cluster 8 are located in the address of the discontinuity in the file/directory domain X3.

FIG. 7A, FIG. 7B and FIG. 7C are diagrams indicating each FAT ft of the FAT12 format, the FAT16 format and the FAT32 format according to a comparative example. FIG. 7A, FIG. 7B and FIG. 7C exemplifies the FAT ftc, FAT ftb and FAT ftc when two files 1, 2 represented by FIG. 6A and FIG. 6B are stored in the file system of the FAT12 format, the FAT16 format, and the FAT32 format. In addition, width of each of the FAT ftc, FAT ftb, FAT ftc is 16 byte (0 byte-F byte), and in each the FAT ftc, FAT ftb, FAT ftc, first two entries e0 and e1 are reservation domain (Reserved). Below, the FAT ft in the file system of the FAT 32 format is called as FAT32 ftc, the FAT ft in the file system of the FAT16 format is called as the FAT16 ftb, and the FAT ft in the file system of the FAT12 format is called as the FAT ftc.

The FAT ftc of FIG. 7A is a FAT (FAT32) ft of the file system of the FAT32 format. The size of each FAT entry in the FAT32 ftc is 32 bit (4 byte). In addition, as described in FIG. 6A and FIG. 6B, the data of file 1 are stored in order of the cluster 2 as top, the cluster 3, the cluster 4, the cluster 8, and the cluster 9. Therefore, in the FAT32 ftc, the FAT entry e2 of the cluster 2 has the next cluster number "0x00000003" of 32 bit (4 byte). In addition, the FAT entry e3 of the cluster 3 has the next cluster number "0x00000004" of 32 bit and the FAT entry e4 of cluster 4 has the next cluster number "0x00000008" of 32 bit. And the FAT entry e8 of cluster 8 has the next cluster number "0x00000009" of 32 bit and the FAT entry e9 of the cluster 9 at the end of the file 1 has value "0xFFFFFFFF" of 32 bit indicating the end. Here, the cluster 8 is a discontinuous cluster.

In addition, as described in FIG. 6B, the data of file 2 are stored in order of the cluster 5 as top, and the cluster 6. Therefore, in the FAT32 ftc, the FAT entry e5 of the cluster 5 has the cluster number "0x00000006" of 32 bit, and the FAT entry e6 of the cluster 6 has the value "0xFFFFFFFF" of 32 bit indicating EOC.

The FAT ftb of FIG. 7B is a FAT (FAT16) ft of the file system of the FAT16 format. The size of each FAT entry of the FAT16 ftb is 16 bit (2 byte). Therefore, in the FAT16 ftb, the FAT entry e2 of the cluster 2 has the next cluster number "0x0003" of 16 bit. In addition, in the FAT entry e3 of the cluster 3 has next cluster number "0x0004" of 16 bit, and the FAT entry e4 of cluster 4 has the next cluster number "0x0008" of 16 bit. And the FAT entry e8 of cluster 8 has the next cluster number "0x0009" of 16 bit and the FAT entry e9 of the cluster 9 which is an end of file has a value "0xFFFF" of 16 bit indicating the end. It is similar about file 2.

Similarly, the FAT fta of FIG. 7C is a FAT (FAT12) ft of the file system of the FAT12 format. The size of each FAT entry of the FAT12 fta is 12 bit (1.5 byte). Therefore, in the FAT12 fta, the FAT entry e2 of the cluster 2 has next cluster number "0x003" of 12 bit. In addition, the FAT entry e3 of the cluster 3 has next cluster number "0x004" of 12 bit, and the FAT entry e4 of the cluster 4 has the next cluster number "0x008" of 12 bit. And the FAT entry e8 of cluster 8 has the next cluster number "0x009" of 12 bit and the FAT entry e9 of the cluster 9 which is an end of file has a value "0xFFF" of 12 bit indicating the end.

FIG. 8A and FIG. 8B are diagrams explaining a specific example of the FAT2 t1 and the discontinuous clusters list t2 according to the embodiment. The size of each FAT entry e0-e9 in the FAT2 t1 in the embodiment, is 2 bit. The FAT entries e0-e9 have four management information of "space (0x00)", "end (0x01)", "continuation (0x10)" and "others (0x11)". In FIG. 8A, the "space (0x00)" is indicated by a white block, the "end (0x01)" is indicated by a raising up diagonal line block, the "continuation (0x10)" is indicated by a vertical line block, and the "others (0x11)" is indicated by dotted line block. But correspondence relationship between four management information and each value "0x00", "0x01", "0x10", "0x11" is not limited to the example of FIG. 8A and FIG. 8B.

As described in FIG. 6A and FIG. 6B, in a specific example, the cluster 2 and the cluster 3, the cluster 3 and the cluster 4, the cluster 5 and the cluster 6, the cluster 8 and the cluster 9 are located in the consecutive address in file/directory domain X3 (referring to FIG. 3). On the other hand, the cluster 4 and the cluster 8 are located in the address of the discontinuity in the file/directory domain X3. Therefore, the FAT entry e2, e3, e5, e8 of the clusters 2, 3, 5, 8 in the FAT2 t1 have a value "0x10" indicating the continuation.

In addition, the FAT entry e4 of the cluster 4 has a value "0x11" indicating "others". In addition, the list of discontinuous clusters t2 has the cluster number "0x00000008" corresponding to the cluster number "0x00000004" of 32 bit. In addition, the FAT entries e6, e9 of the clusters 6, 9 have a value "0x01" indicating the end. In addition, for example, the FAT entry e7 of the cluster 7 which does not store data has a value "0x00" indicating the space.

In addition, in the example of FIG. 8A and FIG. 8B, FAT2 t1 is exemplified a case having the FAT entry of the 2 bit width, but FAT2 t1 is not limited to this example. FAT2 t1 may be constructed by two tables of 1 bit. In addition, as described above, the size of the cluster number, of which the list of discontinuous clusters t2 has, in the example of FIG. 8B, has a biggest size (in this example, it is 32 bit) among the sizes (in this example, among 12 bit, 16 bit, 32 bit) of the FAT entry in the file system of all types of corresponding FAT format. In addition, the list of discontinuous clusters t2 may be implemented by an arrangement, a linear list, a hierarchy structure and a hush table, etc.

The file access program PR according to the embodiment converts the FAT ft of the file system in the storage medium into the FAT2 t1 and the discontinuous cluster list t2 when detected mount of the storage medium (secondary storage device 17 of FIG. 1) such as the SD card. For example, the FAT2 t1 and the discontinuous cluster list t2 are stored by a cache memory (below, called as FAT cache) such as RAM 12. And when the file access program PR detects un-mount of the storage medium, the file access program converts FAT2 t1 into the FAT ft of the file system in the storage medium reversely and writes it in the storage medium. Then, the processing when detecting the mount and un-mount of the storage medium will be explained. Firstly, a comparative flow of the processing when mounting the storage medium will be explained.

(Mount of the Storage Medium)

Figure 9:
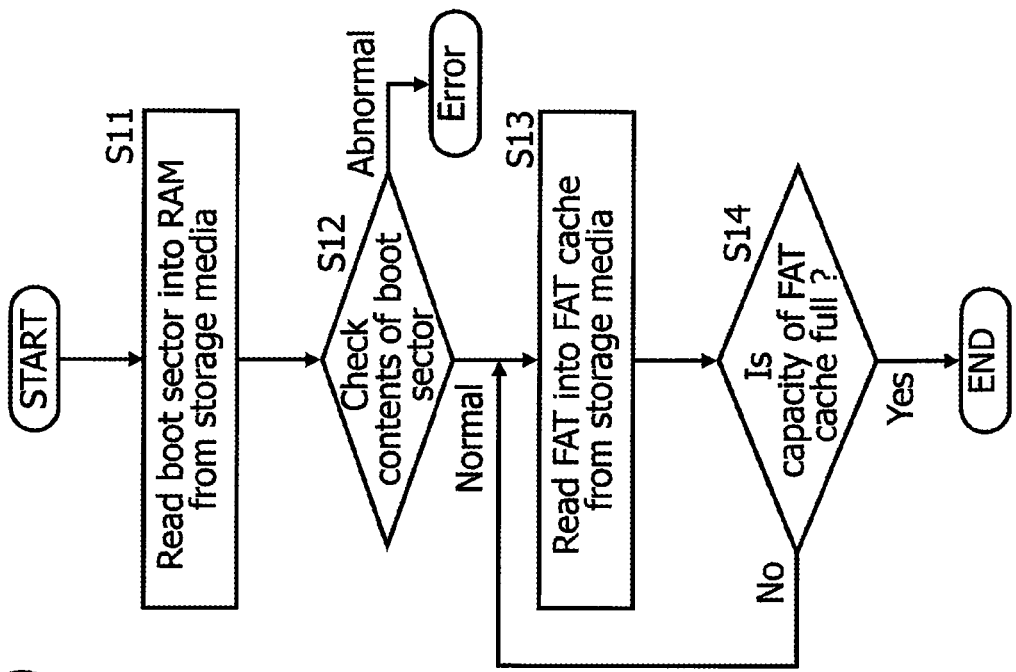
FIG. 9 is a diagram explaining the process when mounting the storage medium according to a comparative example.

FIG. 9 is a diagram explaining the process when mounting the storage medium according to a comparative example. The file access program retrieves a boot sector from the storage medium that is detected, and develops it on the RAM (S11). Then, the file access program determines whether the file system has an abnormality based on the contents of the boot sector (S12). The file access program, when detecting the abnormality (NO/S12), finishes the processing. On the other hand, the file access program, when not detecting the abnormality (YES/S12), retrieves the FAT ft to the RAM (FAT cache) 12 from the storage medium sequentially (S13). The file access program retrieves the FAT ft until the capacity of the FAT cache is full (S14).

Figure 10:
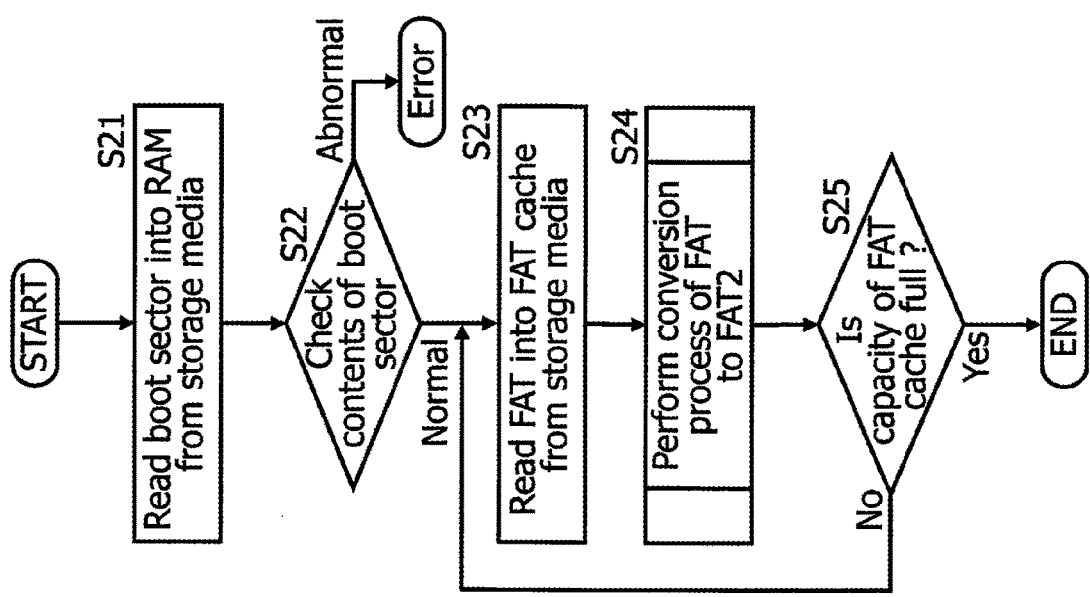
FIG. 10 is a diagram explaining the process when mounting the storage medium according to the embodiment.

FIG. 10 is a diagram explaining the process when mounting the storage medium according to the embodiment. In FIG. 10, same steps as explained by FIG. 3 are indicated same reference signs. The process of the steps S21-S23 in FIG. 10 is similar to the process S11-S13 in the FIG. 9. According, the step S24 and its below steps are explained. The file access program PR converts the FAT ft which is retrieved in the step S23 into the FAT2 t1 and the discontinuous cluster list t2 (S24). The details of the conversion processing will be explained later based on FIG. 11. The file access program PR retrieves and converts the FAT ft until the capacity of the FAT cache is full (S25).

As described in FIG. 10, the file access program PR in the embodiment converts the FAT ft (for example, FAT12, FAT16, FAT32) of the file system into the FAT2 t1 and reads it to the FAT cache. The size of each FAT entry of the FAT2 t1 is smaller than FAT ft. Therefore, according to the file access program PR in the embodiment, it is possible to read the FAT entry into the FAT cache with more wide range and to improve a cache hit rate.

Specially, the size of each FAT entry in the FAT12 fta (referring to FIG. 7C) is 12 bit, and the size of the FAT entry in the FAT2 t1 (referring to FIG. 8B) is 2 bit. Therefore, it is possible that the file access program PR in the embodiment reads the FAT entry of 6 times for FAT12f to into the FAT cache by being based on the FAT2 t1. Similarly, it is possible that the file access program PR in the embodiment reads the FAT entry of 8 times for the FAT16 ftb (referring to FIG. 7B) and the FAT entry of 16 times for the FAT32 ftc (referring to FIG. 7C) into the FAT cache by being based on FAT2 t1.

In addition, the file access program PR in the embodiment, when detecting removal (un-mount) of the storage medium, converts the FAT2 t1 in the FAT cache into the FAT ft reversely based on the list of discontinuous cluster t2.

(Conversion Processing)

The conversion processing with the FAT2 t1 and the discontinuous list of clusters t2 and the FAT ft will be explained based on a flow chart successively. Firstly, the processing to convert the FAT ft into the FAT2 t1 and the discontinuous cluster list t2 will be explained.

Figure 11:
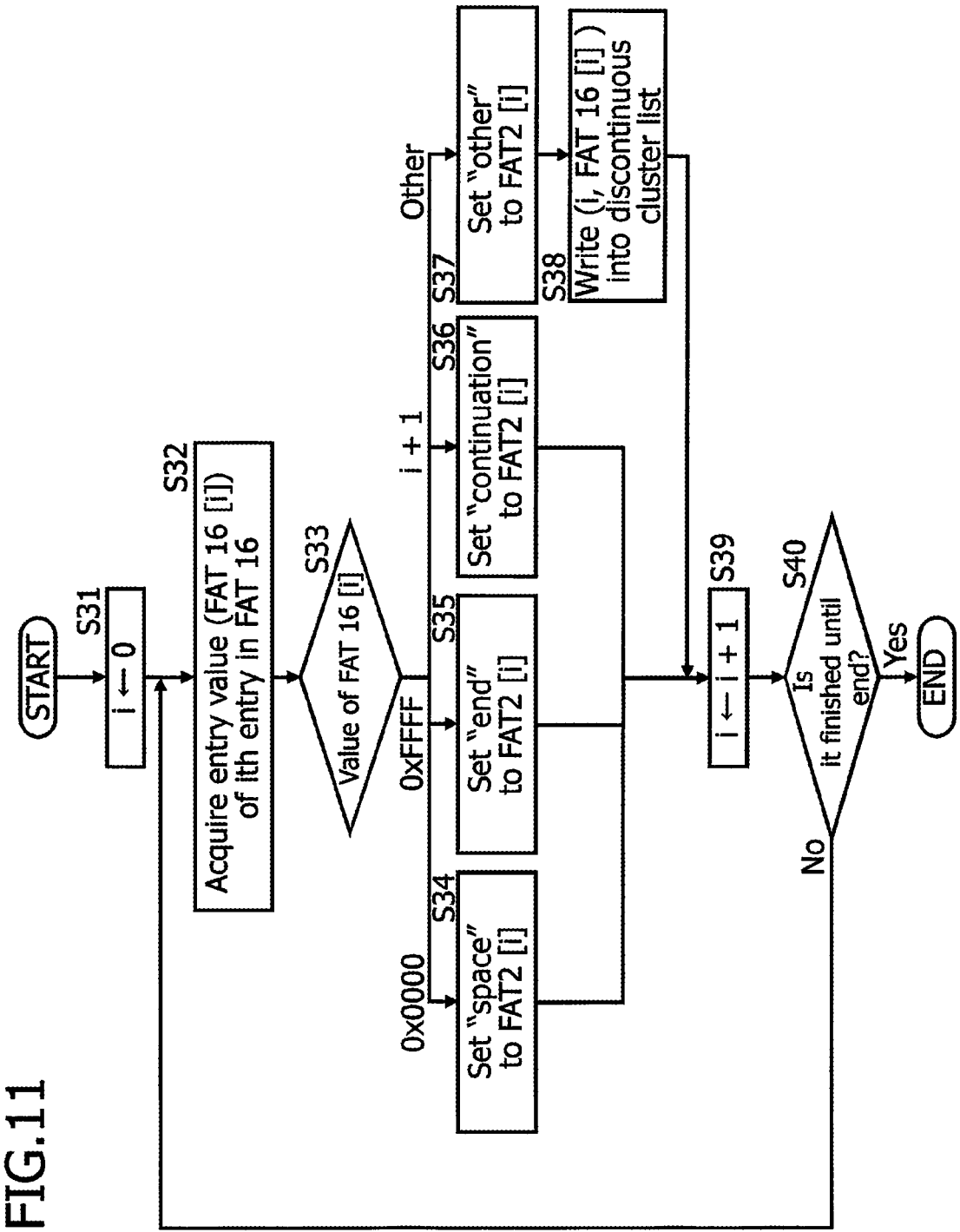
FIG. 11 is a diagram of a flow chart explaining processing to convert the FAT ft into the FAT2 t1 and the discontinuous cluster list t2 in FIG. 10.

FIG. 11 is a diagram of a flow chart explaining processing to convert the FAT ft into the FAT2 t1 and the discontinuous cluster list t2 in FIG. 10. The flow chart of FIG. 11 exemplify the processing to convert the FAT16 ftb (referring to FIG. 7B) into the FAT2 t1 and the discontinuous cluster list t2 (referring to FIG. 8A and FIG. 8B). At first, the file access program PR sets a value "0" in variable "i" (S31). Then, the file access program PR acquires a value of entry FAT16 [i] in the FAT16 ftb (S32). And the file access program PR determines the value of entry FAT16 [i] (S33).

The file access program PR, when the value of the entry FAT16 [i] is the value "0x0000" indicating the space, sets the value "0x00" indicating the space to the entry FAT2 t1 [i] (S34), and sets the value "0x01" indicating the end in the entry FAT2 t1 [i] when the value of the entry FAT 16 [i] is the value "0xFFFF" indicating the end (S35). In addition, the file access program PR sets the value "0x10" indicating the continuation in the entry FAT2 t1 [i] when the value in the entry FAT16 [i] matches with the value which is incremented the value of the variable "i" (S36).

On the other hand, when a value of entry FAT16 [i] is a value other than values "0x0000", "0xFFFF" and "i+1", the file access program PR sets the value "0x11" indicating "other (discontinuous)" in the entry FAT2 t1 [i] (S37). And the file access program PR writes the correspondence relationship with the cluster number "i" and the value of the entry FAT16 [i] indicating the following cluster number in the list of discontinuous clusters t2 (S38). Or, the file access program PR writes the cluster number "i" and a value indicating a defective cluster in the list of discontinuous cluster t2 when the cluster is a defective cluster.

The file access program PR increments the variable "i" successively (S39). And the file access program PR moves to the process in the step S32 and acquires a value of entry FAT16 [i] (S32), when the conversion process of the target FAT16 ftb is not completed (NO/S40). On the other hand, when the conversion process of the target FAT16 ftb is completed (YES/S40), the file access program PR finishes conversion processing.

Figure 12:
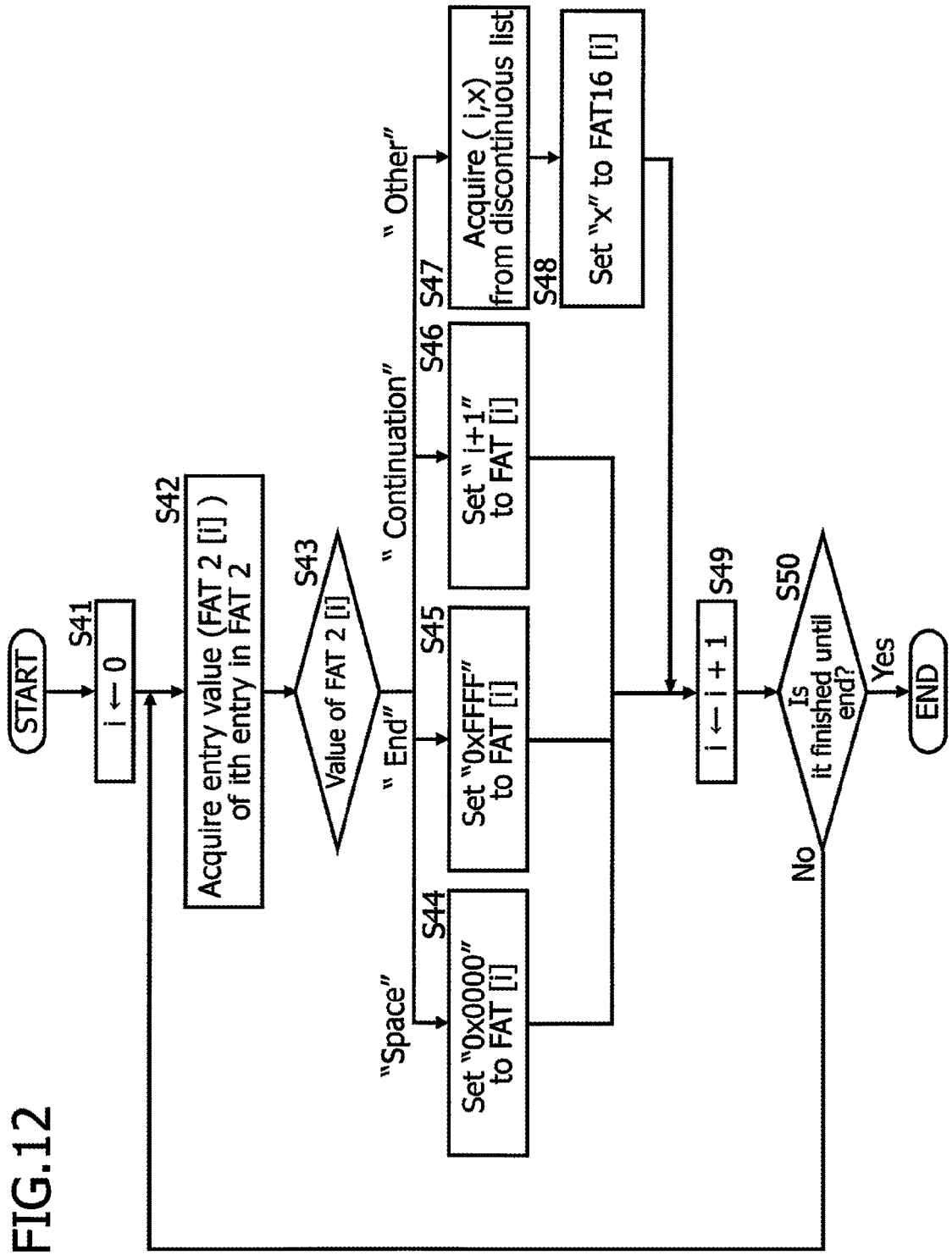
FIG. 12 is a diagram of flow chart explaining processing to reverse-convert the FAT2 t1 and the discontinuous cluster list t2 into the FAT ft in FIG. 16.
Figure 16:
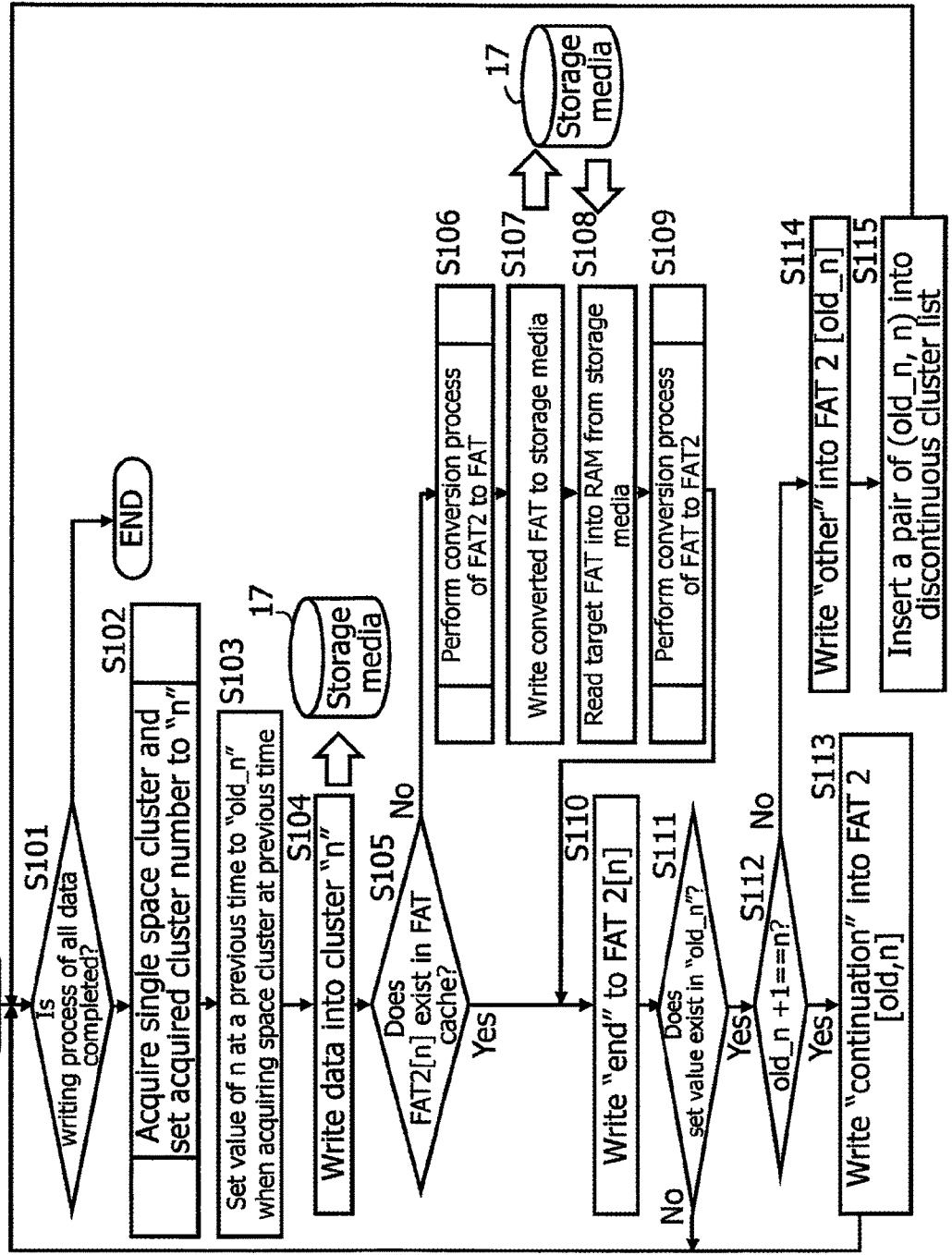
FIG. 16 is a flow diagram of file writing process into the storage medium according to the embodiment.

FIG. 12 is a diagram of flow chart explaining processing to reverse-convert the FAT2 t1 and the discontinuous cluster list t2 into the FAT ft in FIG. 16. FIG. 12 illustrates to exemplify the processing to reverse-convert the FAT2 t1 and the discontinuous cluster list t2 into FAT16 ftb. At first, the file access program PR sets a value "0" in a variable "i" (S41). Then, the file access program PR acquires a value of the entry FAT2 t1 [i] in the FAT2 t1 (S42). And the file access program PR determines a value of the entry FAT2 t1 [i] (S43).

The file access program PR, when the entry FAT2 t1 [i] is a value "0x00" indicating the space, sets the value "0x0000" indicating the space in the entry FAT16 [i] in the FAT16 ftb (S44), and sets value "0xFFFF" indicating the end in the entry FAT16 [i] when the entry FAT2 t1 [i] is a value "0x01" indicating the end (S45). In addition, the file access program PR sets a value which is incremented the variable "i" into the entry FAT16 [i], when the entry FAT2 t1 [i] is a value "0x10" indicating the continuation (S46). In addition, the file access program PR acquires following cluster number "x" corresponding to the cluster number "i" with reference to the discontinuous cluster list t2, when the entry FAT2 t1 [i] is a value "0x11" indicating other (discontinuous) (S47). And the file access program PR sets the value "x" in the entry FAT16 [i] (S48).

The file access program PR increments the variable "i" successively (S49). And the file access program PR moves to the process in the step S42 and acquires a value of entry FAT2 t1 [i] (S42), when the conversion process of the target FAT2 t1 is not completed (NO/S50). On the other hand, when the conversion process of the target FAT2 t1 is completed (YES/S50), the file access program PR finishes conversion processing.

The flow diagrams in FIG. 11 and FIG. 12 exemplified the conversion processing with the FAT16 ftb and the FAT2 t1 and the discontinuous cluster list t2. Similarly, the conversion processing with the FAT2 t1 and the discontinuous cluster list t2 is prepared for the FAT12f ta, the FAT32f tc, and the exFAT ftd. The processing is similar to that of the flow charts in FIG. 11 and FIG. 12.

The reading process and writing process of the file will be explained based on flow chart diagrams successively. The reading process and writing process of the file according to a comparative example will be explained based on flow chart diagrams before explaining the processing in the embodiment.

(File Reading Processing and Writing Processing)

Figure 13:
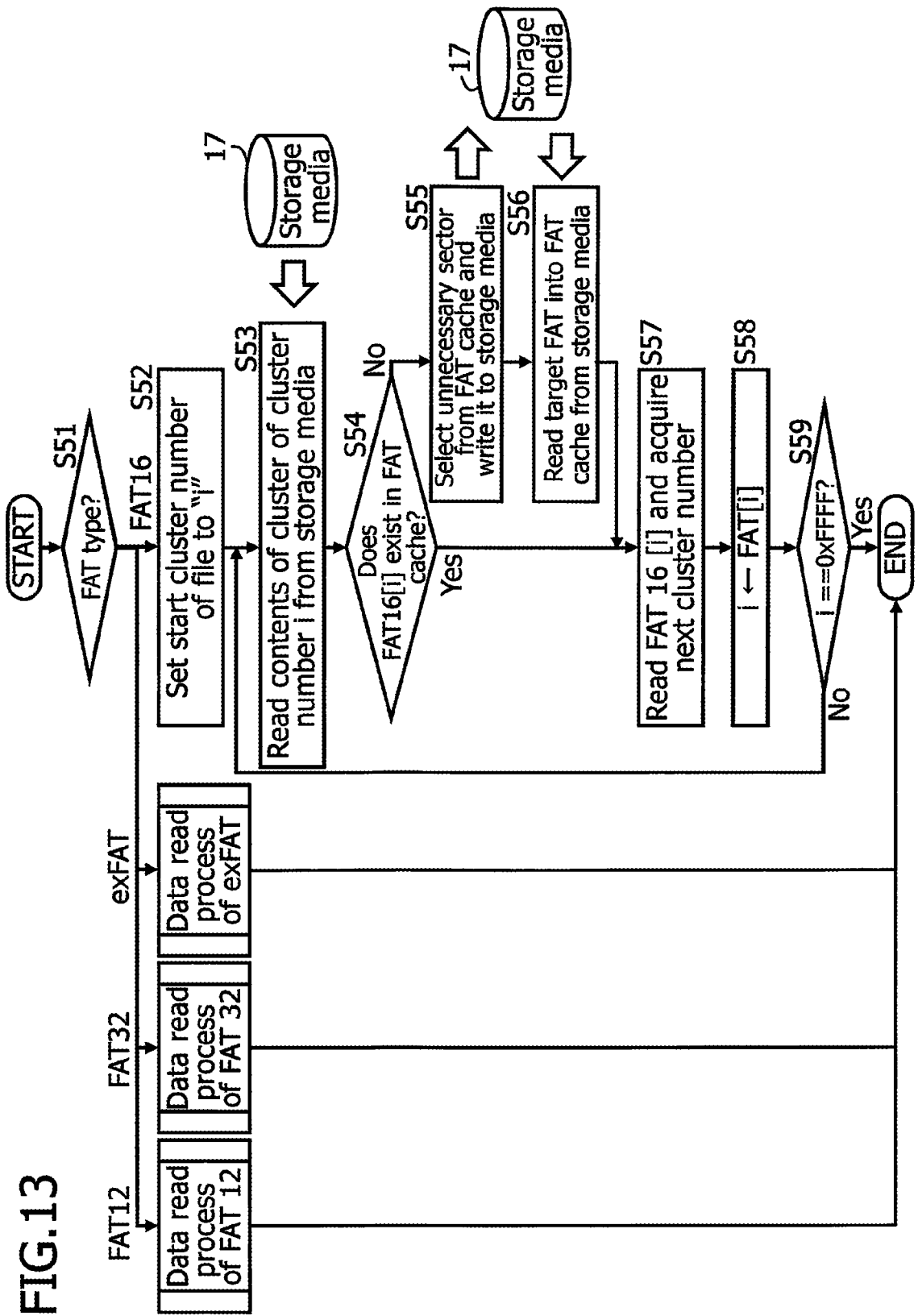
FIG. 13 is a flow chart diagram explaining data reading processing from the storage medium according to the comparative example.

FIG. 13 is a flow chart diagram explaining data reading processing from the storage medium according to the comparative example. At first, the file access program judges the FAT type of the file system (S51). For example, when the file system is the FAT16 format, the file access program sets the cluster number of the start cluster of the relevant file to the variable "i" (S52). Then, the file access program retrieves the data of the cluster of cluster number "i" from the file/directory domain X3 (referring to FIG. 3) in the storage medium (S53).

Then, the file access program determines whether the entry FAT16 [i] of the cluster number "i" in the FAT16 ftb is stored in the FAT cache (S54). The file access program, when the entry FAT16 [i] is not stored in the FAT cache (NO/S54), selects an unnecessary sector among FAT cache from the FAT cache and writes it in the storage medium (S55). In other words, the file access program executes replace process of the FAT cache. And the file access program reads the FAT entry including the entry FAT16 [i] and is able to hold in the sector from the FAT16 ftb and develops it to the FAT cache (S56).

And when the FAT entry exists on the FAT cache (YES/S54) or after replacing the FAT cache (S55, S56), the file access program retrieve the entry FAT16 [i] in the FAT cache. And the file access program acquires the cluster number that the following data of target data, which is stored in the cluster number "i", is stored with reference to the entry FAT16 [i] (S57). In addition, the file access program sets the cluster number acquired in the step S57 to the variable "i", as a cluster number for the next reading target.

When a value of the cluster number "i" is "0xFFFF" (YES/S59), that is, when a cluster of the cluster number "i" is a cluster of the tail of the reading target file, the file access program finishes processing. On the other hand, when a value of the cluster number "i" is not "0xFFFF" (NO/S59), the file access program moves to the process in the step S53 and reads the data of the cluster of cluster number "i" for the next reading target (S53).

In addition, when reading file in the file system of the FAT12 format, the FAT32 format and the exFAT format, as same as above process, the file access program performs similar processing as the steps S52-S59. But, because the process in the steps S52-S59 are different from depending on the type of the FAT format about data process, the data reading processing is needed to describe for a case depending on the type of the FAT format. The man-hours of the program increase, and maintenance work becomes complicated.

In addition, the occurrence frequency of replacing processing of the FAT cache is different depending on the type of the FAT format. In the example, the case that the sector size is 512 bytes will be explained. In the case of the FAT16 format, the size of the FAT entry is 16 bit (=2 byte). Therefore, 1 sector holds the FAT entry of 256 (=512/2) units as maximum. Therefore, replacing process of the FAT cache occurs at one frequency for the reading processing of 256 clusters in the FAT cache.

Similarly, in the case of the FAT12 format, the size of the FAT entry is 12 bit (=1.5 byte), therefore 1 sector holds the FAT entry of 341 ($\approx$512/1.5) units, as maximum. In other words, the replacing process of the FAT cache in the FAT12 format occurs at one frequency for the reading processing of 341 clusters. Similarly, in the case of an FAT32 format, the size of the FAT entry is 32 bit (=4 byte), therefore 1 sector holds the FAT entry of 128 (=512/4) units, as maximum. Therefore, the replacing process of the FAT cache in the FAT32 format occurs at one frequency for the reading processing of 128 clusters.

In this way, because the ratio of FAT entry, of which the FAT cache is able to hold with expansion of the size of the FAT entry, decreases, the frequency of the replacing processing of the FAT cache becomes higher. This causes that the I/O processing for the storage medium occurs more frequently with expansion of the size of the FAT entry, and access efficiency is low.

Figure 14:
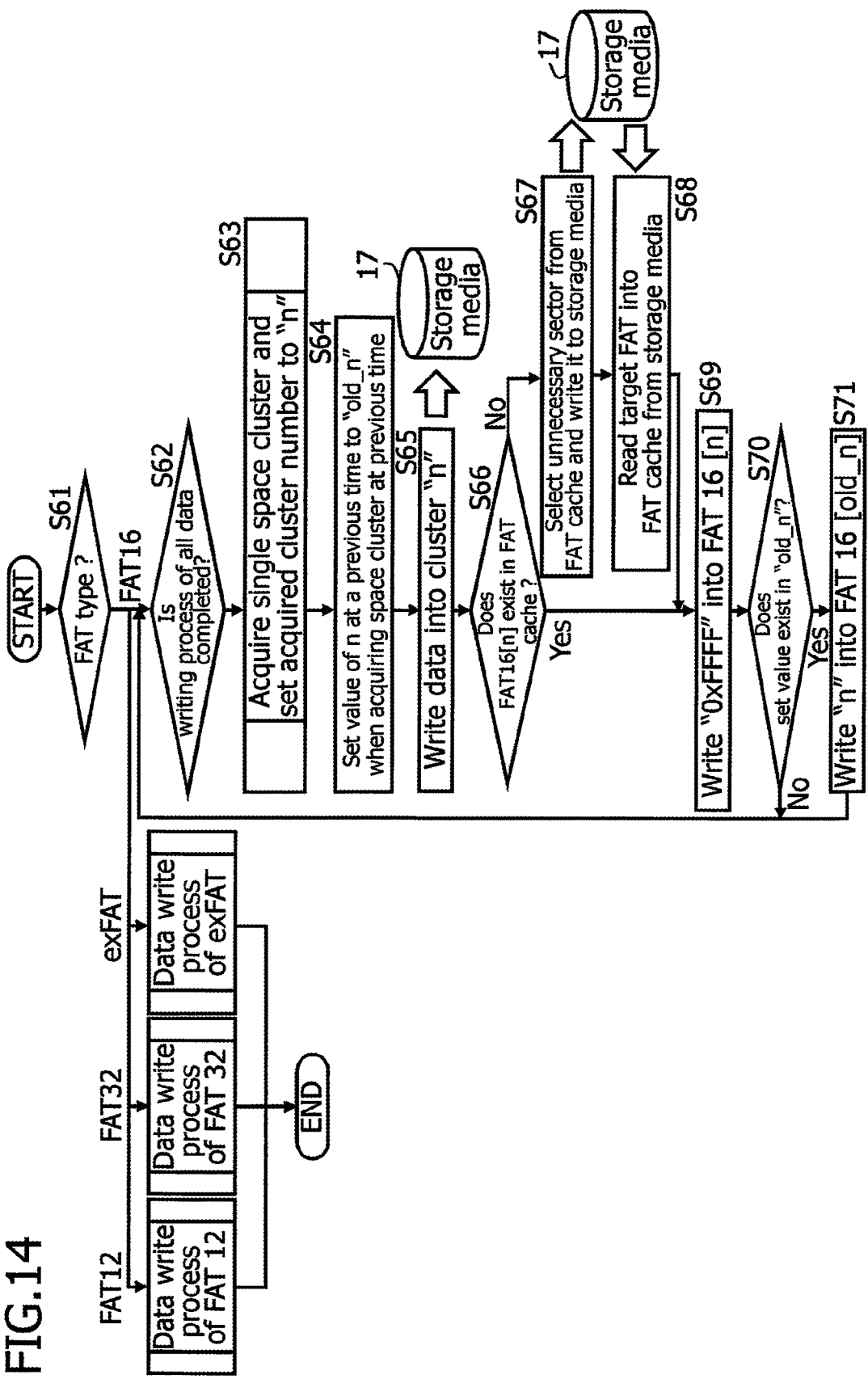
FIG. 14 is a flow diagram of data write process from the storage medium according to a comparative example.

FIG. 14 is a flow diagram of data write process from the storage medium according to a comparative example. At first, the file access program determines the FAT type of the storage medium (S61). For example, when the write processing of all data does not complete in the file system of the FAT 16 format (S62/NO), the file access program acquires one space cluster and sets the cluster number of the cluster which is acquired to the variable "n" (S63). In addition, the file access program sets a value of last variable "n" in the variable "old_n", when there is the space cluster which is acquired (S64). The variable "old_n" indicates the cluster number of the cluster of the previous cluster in the cluster chain of the file. And the file access program writes the data into a cluster of the cluster number "n".

The file access program determines whether the entry FAT16 [n] of cluster number "n" in the FAT16 ftb is stored (existed) on the FAT cache (S66). When the entry FAT 16 [n] does not exist in the FAT cache (NO/S66), the file access program selects an unnecessary sector in the FAT cache and write-backs it to the storage medium (S67). In other words, the file access program performs the replacing process of the FAT cache. And the file access program reads the FAT entry including entry FAT16 [i] from the FAT16 ftb and being able to hold in sector, and develops it to the FAT cache (S68).

When the entry FAT 16 [n] exists in the FAT cache (YES/S66) or after completing the replacing process of the FAT cache (S67, S68), the file access program writes a value "0xFFFF" indicating the tail of the file into the entry FAT16 [n] in the FAT cache (S69). Then, the file access program determines whether a value is set in the variable "old_n" (S70). When the value is set in the variable "old_n" (YES/S70), the file access program sets the value in the variable "n" in the entry FAT16 [old_n]. In this way, the cluster number "n" of the following cluster is stored in the entry FAT16 [old_n] of the cluster which is a previous cluster in the cluster chain.

And when the value is not set in the variable "old_n" (NO/S70), or after having written the value of the variable "n" into the entry FAT16 [old_n] (S71), the file access program moves to the process in the step S62, and determines whether the write process of data is completed (S62). When the write process of data is not completed (NO/S62), the file access program performs the process in the steps S63-S71 again. On the other hand, when the write process of data is completed (YES/S62), the file access program finishes data write processing.

In addition, when reading a file of the file system of the FAT 12 format, the FAT 32 format and the exFAT format like the reading process of the file depicted by FIG. 13, the file access program performs processing as similar to the process in the steps S62-S71. But, because the process in the steps S62-S71 is different depending on the type of the FAT format about data processing, the data write processing is needed to describe for cases depending on the type of the FAT format. Thereby, the man-hours of the program increase, and maintenance work becomes complicated.

In addition, because the ratio of FAT entry of which the FAT cache is able to hold with expansion of the size of the FAT entry decreases, as same as the reading process of the file depicted by FIG. 13, the frequency of the replacing processing of the FAT cache becomes higher. This indicates that I/O processing for the storage medium occurs more frequently with expansion of the size of the FAT entry, and the access efficiency is low.

Next, the reading process and the writing process of the file according to the embodiment will be explained based on flow chart diagrams.

Figure 15:
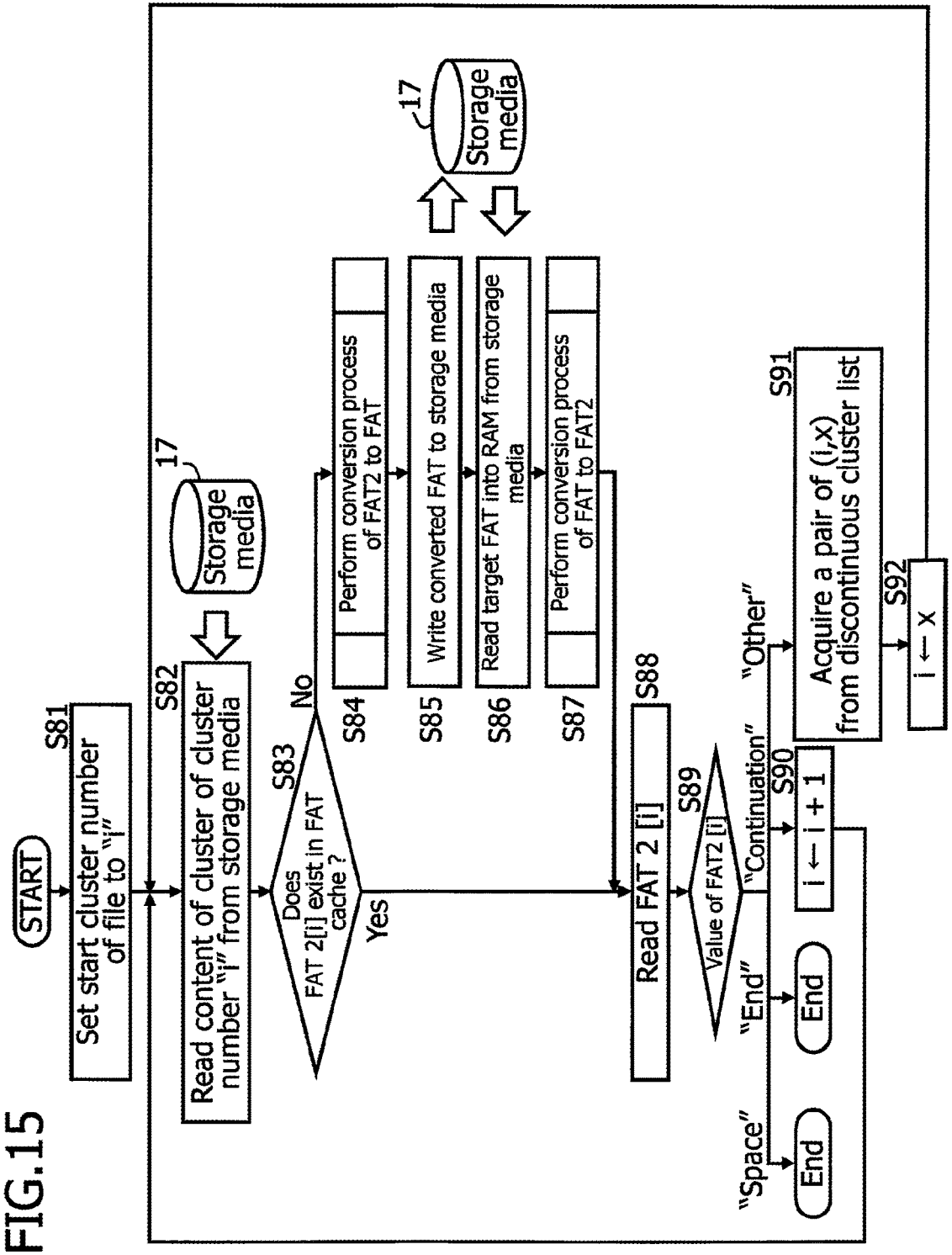
FIG. 15 is a flow diagram explaining the reading process of file from the storage medium according to the embodiment.

FIG. 15 is a flow diagram explaining the reading process of file from the storage medium according to the embodiment. At first, the file access program PR according to the embodiment sets the cluster number of the start cluster in the reading target file into the variable "i" (S81). Then, the file access program PR retrieves the data of the cluster of cluster number "i" from the file/directory domain X3 (referring to FIG. 3) in the storage medium (the secondary storage device 17 of FIG. 1).

Then, the file access program determines whether the entry FAT2 t1 [i] of the cluster number "i" in the FAT2 t1 is stored (existed) on the FAT cache (S83). When the entry FAT2 t1 [i] does not exist in the FAT cache (NO/S83), the file access program PR selects an unnecessary sector in the FAT cache, and converts the FAT2 t1 and the discontinuity cluster list t2 in the sector into the FAT ft of the FAT format of the storage medium (S84). The conversion processing is as same as that illustrated by the flow diagram depicted by FIG. 12.

The file access program PR writes the FAT ft after the conversion into the storage medium successively (S85). Then, the file access program PR reads the FAT entries, which includes the FAT entry of cluster number "i" and corresponds to the number of the FAT entry in the FAT2 t1 in which the sector is able to hold, from the FAT ft in the storage medium (S86). And the file access program PR converts the FAT ft which it retrieved into the FAT2 t1 and the discontinuous cluster list t2 (S87). The conversion processing is as same as that illustrated by the flow diagram depicted by FIG. 11.

The file access program PR according to the embodiment converts between the FAT ft of the file system of the storage medium and the FAT2 t1 and the discontinuous cluster list t2. Thereby, the file access program PR does not need to describe by dividing cases depending on the type of the FAT format about process except the conversion processing (S84, S87) even if it is the FAT format of either type.

And when the entry is on the FAT cache (YES/S83) or after replacing of the FAT cache (S84-S87), the file access program PR retrieve the entry FAT2 t1 [i] in the FAT cache (S88). When a value of the entry FAT2 t1 [i] is a value indicating "0x00" (space) or "0x01" (the end) (S89), the file access program PR finish processing. In addition, when a value of entry FAT2 t1 [i] is a value indicating "0x10" (consecutively) (S89), the file access program PR increment a value of variable "i" and moves to the process in the step S82, and read the data of the cluster of cluster number "i" from the file/directory domain X3 in the storage medium (S82).

In addition, when a value of entry FAT2 t1 [i] is a value indicating "0x11" (others) (S89), the file access program PR acquire cluster number "x" of the follower cluster of the cluster of cluster number "i" in the cluster chain based on the cluster number "i", from the list of discontinuous clusters t2 (S91). And the file access program PR set the value "x" in the variable "i" (S92), and move to the process in the step S82, and retrieves the data of the cluster of cluster number "i" from the file/directory domain X3 in the storage medium (S82). As above described, there are few ratios of the FAT entry having the value "0x11" (others). Therefore, it is possible that the file access program PR perform the reading process of the file by referring to the FAT2 t1 mainly.

FIG. 16 is a flow diagram of file writing process into the storage medium according to the embodiment. At first, the file access program PR according to the embodiment, when the write process of all data is not completed (NO/S101), acquire one space cluster and set the cluster number of the cluster which is acquired in the variable "n" (S102). In addition, when there is the space cluster which is acquired last time, the file access program PR write a value of the variable "n" last time in the variable "old_n" (S103). The variable "old_n" indicates the cluster number of the cluster in the cluster chain in front.

In this time, because the size of the FAT entry is small, it is possible that the file access program PR according to the embodiment increase the ratio of FAT entry held in the FAT cache and search a space cluster fast. In addition, it is possible that the file access program PR according to the embodiment search space clusters fast, because the number of FAT entries that the CPU 11 performs the process once increases by being based on small size of the FAT entry.

And the file access program PR writes the data into a cluster of cluster number "n" (S104). Then, the file access program PR determine whether or not the entry FAT2 t1 [n] of the cluster number "n" in the FAT2 t1 is on the FAT cache (S105). When determined that the entry FAT2 t1 [n] is not on the FAT cache (NO/S105), the file access program PR select an unnecessary sector in the FAT cache, and converts the FAT2 t1 and the discontinuity cluster list t2 in the sector into the FAT ft of the FAT format in the storage medium (S106). The conversion processing is just what is illustrated by the flow chart depicted by FIG. 12.

The file access program PR writes the FAT ft after the conversion into the storage medium successively (S107). Then, the file access program PR read the FAT entry which includes the FAT entry of the cluster number "n" and corresponds to the number of the FAT entry of FAT2 t1 which the sector is able to hold, from the FAT ft in the storage medium (S108). And the file access program PR converts the FAT entry which is retrieved into the FAT2 t1 and the discontinuous cluster list t2. The conversion processing is just what is illustrated by the flow chart depicted by FIG. 11.

When determined that the entry FAT2 t1 [n] is on the FAT cache (YES/S105), or after replacing the FAT cache (S106-S109), the file access program PR write the value "0x01" indicating the end of the file into the entry FAT2 t1 [n] in the FAT cache (S110). Then the file access program PR determine whether or not a value is set in the variable "old_n" (S111). When a value is set in the variable "old_n" (YES/S111), the file access program PR judge whether a value that the variable "old_n" is incremented matches with a value of variable "n" (S112). When the value matches with the value of the variable "n" (YES/S112), the file access program PR write the value "0x10" indicating the continuation into the entry FAT2 t1 [n] in the FAT cache (S113).

On the other hand, when the value does not match with the value of the variable "n" (NO/S112), the file access program PR write the value "0x11" indicating other (discontinuous) into the entry FAT2 t1 [n] in the FAT cache (S114). In addition, the file access program PR writes corresponding relationship with the cluster number "old_n" and the cluster number "n" into the list of discontinuous cluster t2 (S115). The cluster constituting data has high probability to be located in the consecutive address of the file/directory domain X3. Therefore, it is possible that the file access program PR perform the write process of the file by referring to the FAT2 t1 mainly.

As illustrated in the flow diagrams of FIG. 15 and FIG. 16, it is possible that the file access program PR according to the embodiment make the file access processing except the conversion processing common even if the type of the FAT format of the file system is either one by being based on the FAT2 t1 and the discontinuity cluster list t2. Because the data read processing and the data write processing is not need to divide for a case depending on the type of the FAT format, the man-hour of the program is controlled, and maintenance work is reduced.

In addition, because of a small size of the FAT entry of the FAT2 t1, it is possible that the file access program PR according to the embodiment increase the ratio of FAT entry held in the FAT cache and access the file faster. In addition, it is possible that the file access program PR according to the embodiment largely reduce frequency of replacing of the FAT cache, because it is based on the FAT2 t1.

For example, when the sector has 512 bytes, it is possible that one sector hold the FAT entry of FAT2 of 2048 (=512/0.25=512/2/8) units. In other words, in the embodiment, the replacing processing of the FAT cache is assumed to occur at one frequency for the reading processing of 2048 clusters. As mentioned above, the replacing processing of the FAT cache are assumed to occur at one frequency for the reading processing of 341 clusters in the case of FAT 12 format, of 256 clusters in the case of the FAT16 format, and of 128 clusters in the cases of the FAT 32 format and the exFAT format. Therefore, it is possible that the file access program PR according to the embodiment largely reduce frequency of FAT cache replacing process, and reduce I/O processing for the storage medium, and improve access efficiency.

In addition, the size of the FAT entry according to the embodiment is small for the FAT entry of each FAT format. Therefore, for example, when the CPU 11 (referring to FIG. 1) processes data to 32 bit unit, the number of the FAT entry of which the CPU 11 once process increase, thereby it is possible that the CPU 11 process the FAT entry faster. It is possible that the file access program PR search a target cluster faster, because the CPU 11 process the FAT entry faster.

As described above, the file access program PR according to the embodiment has an access process to access the file, which is divided into a plurality of clusters of the data region and is stored, based on cluster management tables t1, t2 having the chain information of the cluster. In addition, the cluster management tables t1 and t2 have a first table (FAT2) t1, which has first management information corresponding to the first cluster when the first cluster and the second following cluster chaining the first cluster are located in the continuous addresses in the data region and second management information corresponding to the first cluster when the first cluster and the second cluster are located in the discontinuous addresses, and a second table (list of discontinuous clusters) t2 having the cluster identification information of the first and the second clusters to be located in the discontinuous addresses.

Because of small size of each entry of the first table (FAT2) t1, it is possible that the file access program PR according to the embodiment increase the ratio of entry held in the cache memory, improve a cache hit rate and improve the access efficiency of the file. In addition, because the size of each entry of the first table (FAT2) is small, it is possible that the file access program PR increase the number of entries of which the CPU 11 processes at a time. Thereby, it is possible that the file access program PR searches a cluster faster, and improve the access efficiency of the file. In addition, it is possible that the file access program PR according to the embodiment detects the position of the following cluster of a cluster equivalent easily based on the second table (list of discontinuous clusters) t2.

In addition, the file access program PR according to the embodiment accesses the file according to common cluster management tables t1 and t2 which are compatible with FAT ft of several types of file system. Therefore, it is possible that the file access program PR according to the embodiment carries out the file access based on the unified processing regardless of the type of the FAT format of the file system. Thereby, it is possible to unify the program and to reduce a maintenance man-hour.

In addition, in the file access program PR according to the embodiment, the first table has third management information corresponding to the third cluster which does not store the data of the file and fourth management information corresponding to the fourth cluster which stored data of the end of the file. Thereby, it is possible that the file access program search the cluster of the space and the cluster of the tail constituting a file with a high speed.

In addition, in the file access program PR according to the embodiment, the first table has second management information corresponding to the fifth cluster which is different from the first to the fourth cluster, and the second table has the cluster identification information of the fifth cluster and the state information of the fifth cluster more. Thereby, the file access program searches such as defective clusters with a high speed.

In addition, the file access program PR according to the embodiment has a conversion process to convert the file allocation table (below, called as FAT) into the cluster management tables t1, t2, the file allocation table corresponding to the plurality of clusters and including the cluster identification information of the second cluster as the chain information. Thereby, it is possible that the file access program PR accesses it according to the unified processing by being based on the cluster management tables t1, t2 regardless of the type of the FAT format of the file system.

In addition, the conversion process of the file access program according to the embodiment, converts the FAT ft of the storage medium which is detected into the cluster management table when detecting an attachment of a storage medium and reverse converts the cluster management table into the FAT ft when detecting a removal of the storage medium. Because the file access program PR converts the cluster management tables t1, t2 into FAT ft of the file system, the cluster management tables t1, t2 have compatibility with the FAT ft of the file system.

In addition, by the file access program PR according to the embodiment, the cluster management tables t1, t2 are stored into first area (FAT cache, RAM) 12, and FAT ft is stored into second area 17 (storage medium, secondary storage device) in which the access is later than the first area. It is possible that the file access program increase the ratio of entry held in the FAT cache and speed up the search of the cluster by storing the cluster management table t1, t2 into the FAT cache.

In addition, the conversion process of the file access program PR according to the embodiment, when the cluster management tables t1, t2 in the first storage area (FAT cache, RAM) 12 does not include an entry of the cluster to be accessed, reverse converts the first cluster management tables t1, t2 in the first storage area 12, into the FAT ft, and stores it into the second storage area (storage medium, secondary storage device) 17. Further, the conversion process converts the FAT ft including the entry of the cluster to be accessed in the second storage area 17 into the cluster management tables t1, t2 and reads it into the first storage area 12. Thereby, it is possible that the file access program PR according to the embodiment carries out replacing process of the cluster management tables t1, t2 in the FAT cache. In addition, because the size of each entry of the first table (FAT2) t1 is small, it is possible that the file access program PR largely reduce frequency of the FAT cache replacing, reduce I/O processing for the storage medium 17, and improve access efficiency.

In addition, the conversion process of the file access program PR according to the embodiment do the entry of FAT ft which has the number of the entries of the cluster management tables t1, t2 corresponding to the size of the first storage area (FAT cache, RAM) 12, with a conversion object. It is possible that the file access program PR increase the ratio of entry held in the FAT cache by storing the cluster management tables t1, t2 of which the number of entry is a size of the first storage area into the FAT cache.

In addition, the access process of the file access program PR according to the embodiment, stores the first management information first into the first table (FAT2) t1 of the first cluster when writing the data of the file into the second cluster located in the address to continue with the first cluster and stores the second management information into the first table (FAT2) t1 of the first cluster when writing the data of the file into the second cluster located in the address not to continue with the first cluster. Further, the access process of the file access program PR according to the embodiment stores the cluster identification information of the first and second clusters into the second table (list of discontinuous clusters) t2. Thereby it is possible that the file access program PR according to the embodiment generates the cluster management table t1, t2 at the writing time of the data of the file.

In addition, the access process of the file access program PR according to the embodiment, when reading data of the file from the second cluster, reads the data from a cluster located in the consecutive address with the first cluster when the first management information is stored corresponding to the first cluster in the first table (FAT2) t1, and reads the data from a cluster of the cluster identification number corresponding to the cluster identification information of the first cluster with reference to the second table (list of discontinuous clusters) t2 when the second management information is stored corresponding to the first cluster in the first table (FAT2) t1. Thereby, it is possible that the file access program PR according to the embodiment retrieves the data of the file based on the cluster management table t1, t2.

(Second Embodiment)

In the first embodiment, a case that the FAT2 t1 and the discontinuous cluster list t2 is stored in the FAT cache is exemplified. In contrast, in the second embodiment, the file access program PR stores the FAT2 t1 and the discontinuous cluster list t2 to the storage medium (the secondary storage device 17 in FIG. 1) in addition to the FAT cache. The file access program PR, for example, stores the FAT2 t1 and the discontinuous list t2 in the FAT cache into the storage medium when replacing the FAT cache, and converts the FAT2 t1 and the discontinuity cluster list t2 in the storage medium into FAT ft and write back it into the FAT cache after replacing the FAT cache.

Figure 17A:
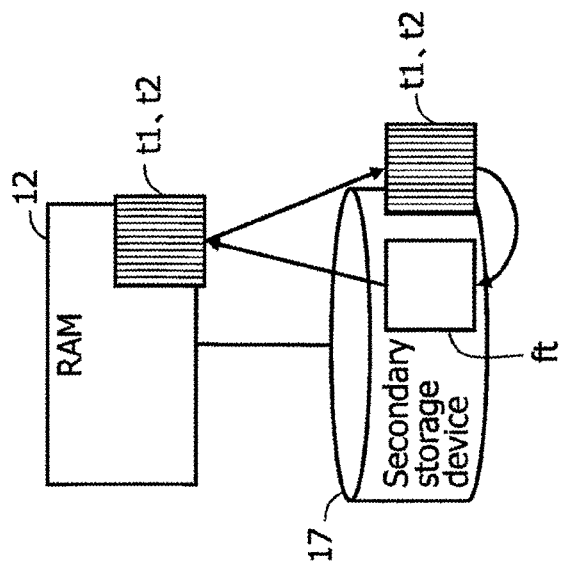
FIG. 17A and FIG. 17B are diagrams explaining a storage place of the FAT2 t1 and the discontinuous cluster list t2 according to the second embodiment.
Figure 17B:
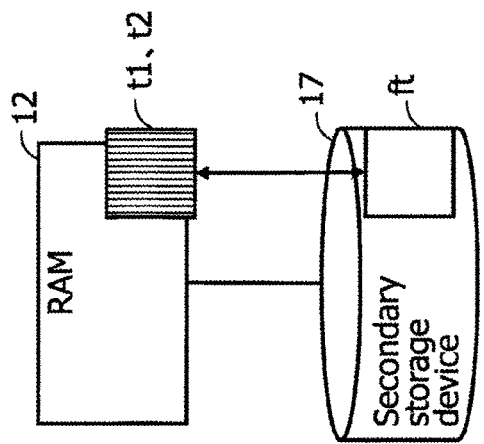

FIG. 17A and FIG. 17B are diagrams explaining a storage place of the FAT2 t1 and the discontinuous cluster list t2 according to the second embodiment. FIG. 17A illustrates the RAM (FAT cache) 12 and the secondary storage device 17 according to the first embodiment. In the first embodiment, the FAT2 t1 and the discontinuous cluster list t2 are stored in the RAM 12 (FAT cache) as illustrated by FIG. 17A. In contrast, in the second embodiment, the FAT2 t1 and the discontinuity cluster list t2 are stored into the secondary storage device 17 in addition to the RAM 12 as illustrated in FIG. 17B. In other words, the secondary storage device 17 in the second embodiment stores the FAT2 t1 and the discontinuity cluster list t2 in addition to the FAT ft.

Next, the process in the second embodiment will be explained. The process when mounting the storage medium, and the conversion processing with the FAT ft and the FAT2 t1 and the discontinuity cluster list t2 in the second embodiment are similar to the processes in the first embodiment. Therefore, the explanations of these processes are omitted. And the reading process of the file from the storage medium and the writing processing of the file to storage medium are explained based on following flow charts.

Figure 18:
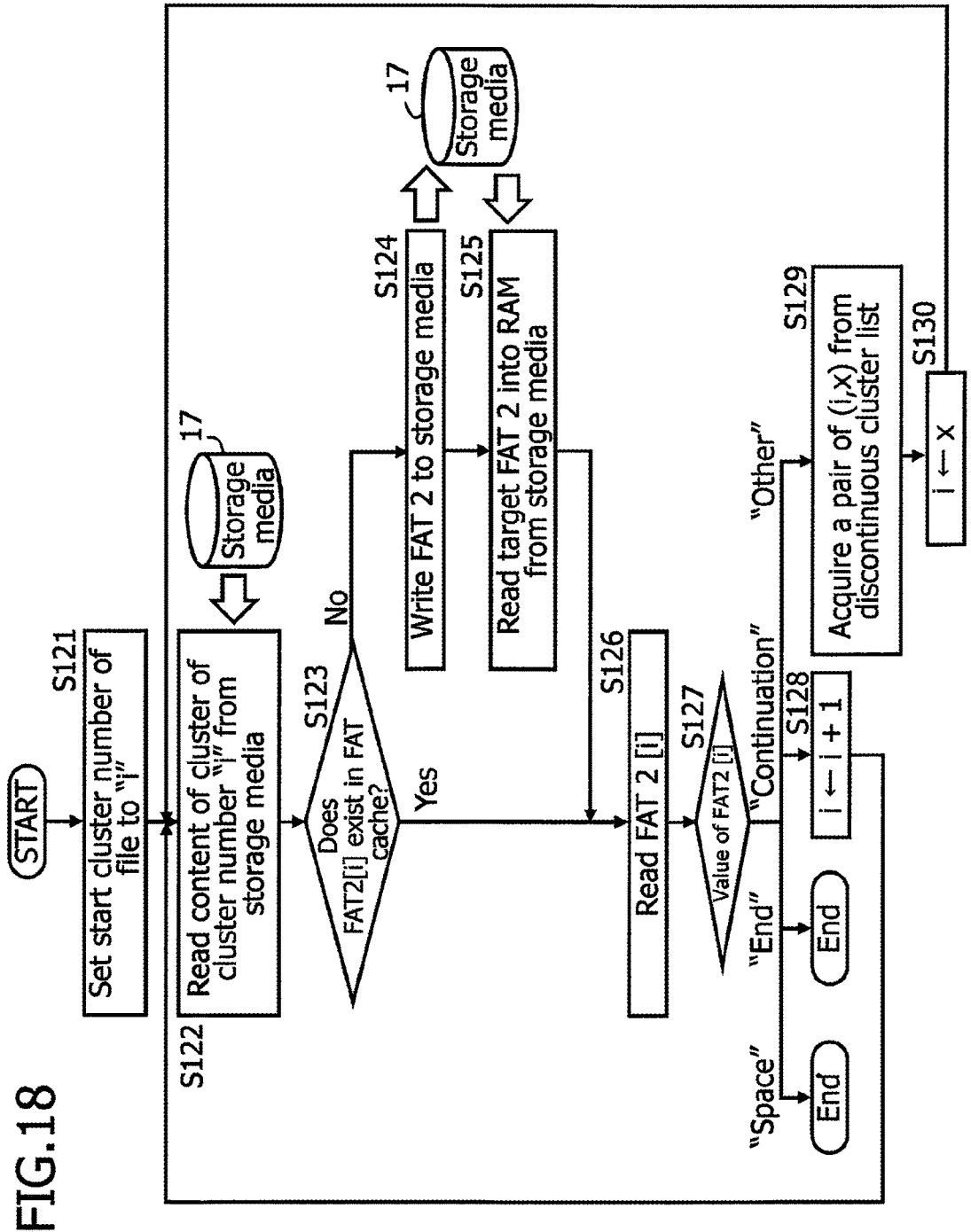
FIG. 18 is a flow diagram explaining the reading processing of the file from the storage medium according to the second embodiment.

FIG. 18 is a flow diagram explaining the reading processing of the file from the storage medium according to the second embodiment. In FIG. 18, the process S121-S123 are similar to the process S81-S83 in the first embodiment as illustrated by FIG. 15. Therefore, the explanations of these processes are omitted. The file access program PR according to the second embodiment, when the FAT 2[i] does not exist in the FAT cache (NO/S123), selects an unnecessary sector in the FAT cache and write it into the storage medium 17 (S124). Then, the file access program PR according to the second embodiment does not convert the FAT2 t1 and the discontinuous cluster list t2 into the FAT ft.

Then the file access program PR retrieves the FAT entry including the FAT entry of cluster number "i" to the FAT cache from the FAT2 t1 in the storage medium (S125). In addition, the file access program PR converts the FAT ft including the FAT entry of cluster number "i" into the FAT2 t1 and the discontinuous cluster list t2 and reads out it to the FAT cache when the FAT entry of the cluster number "i" is not included in the FAT2 t1 in the storage medium. The processes S126-S130 after reading the FAT entry including the FAT entry of cluster number "i" are similar to the process in the step S88-S92 in the first embodiment as depicted by FIG. 15 and these explanation are omitted.

Figure 19:
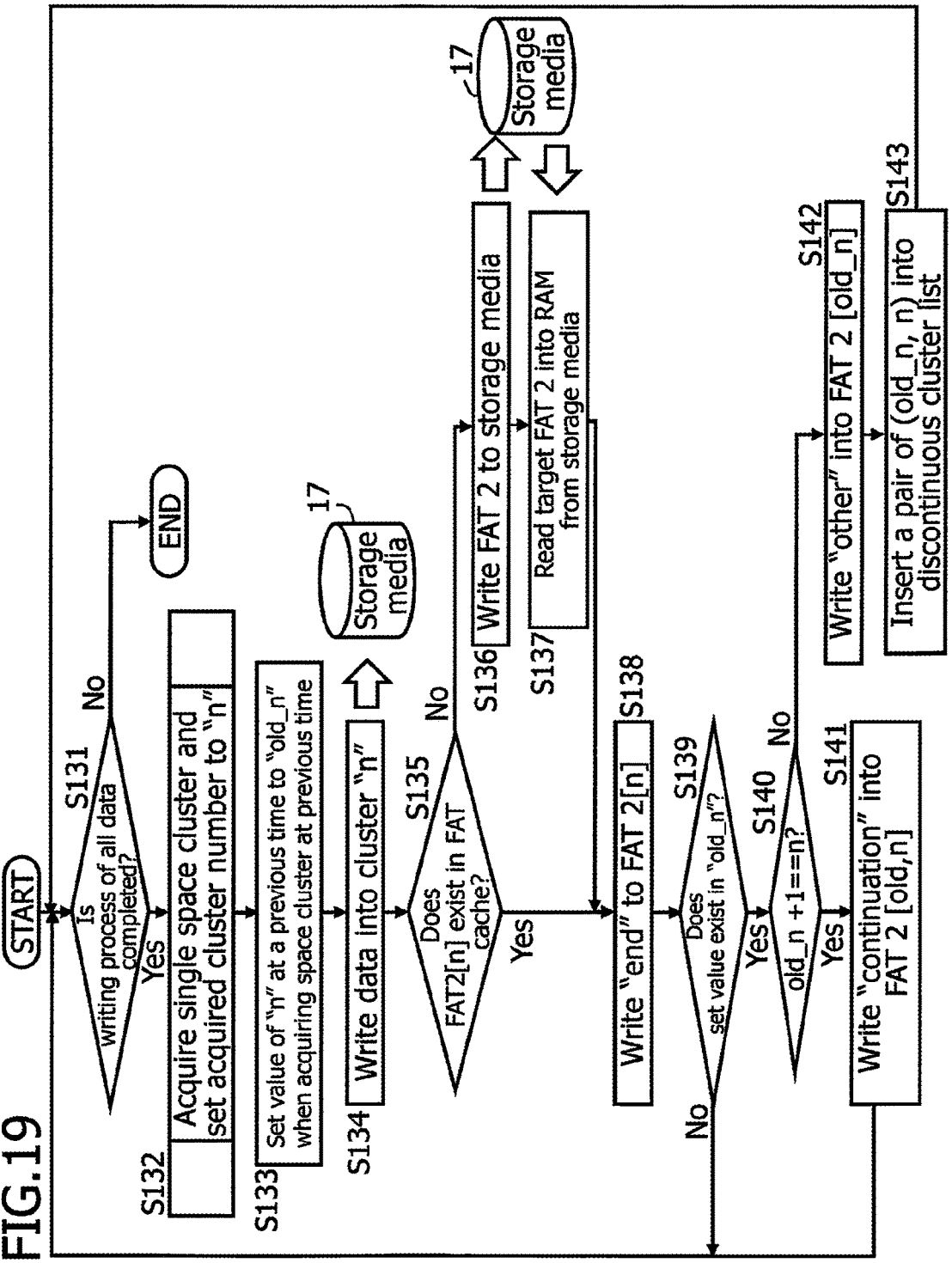
FIG. 19 is a flow diagram explaining the write processing of the file to the storage medium according to the second embodiment.

FIG. 19 is a flow diagram explaining the write processing of the file to the storage medium according to the second embodiment. In FIG. 19, the processes of steps S131-S135 are similar to the processes in the steps S101-S105 in the first embodiment depicted by FIG. 16. Therefore, the explanations of these processes are omitted. The file access program PR according to the second embodiment, when the FAT 2 [n] does not exist in the FAT cache (NO/S135), selects an unnecessary sector in the FAT cache and write it into the storage medium 17 (S136). Then, the file access program PR according to the second embodiment does not convert the FAT2 t1 and the discontinuous cluster list t2 into the FAT ft.

Then the file access program PR retrieves the FAT entry including the FAT entry of cluster number "i" to the FAT cache from the FAT2 t1 in the storage medium (S137). In addition, the file access program PR converts the FAT ft including the FAT entry of cluster number "i" into the FAT2 t1 and the discontinuous cluster list t2 and reads out it to the FAT cache when the FAT entry of the cluster number "i" is not included in the FAT2 t1 in the storage medium. The processes S138-S143 after reading the FAT entry including the FAT entry of cluster number "i" are similar to the process in the step S110-S115 in the first embodiment as depicted by FIG. 16 and these explanation are omitted.

Successively, write back process to the FAT ft of the FAT2 t1 and the discontinuous cluster list t2 in the storage medium will be explained based on a flow chart in FIG. 20. The file access program PR according to the second embodiment converts, for example, the FAT2 t1 and the discontinuity cluster list t2 in the storage medium into the FAT ft in a different timing after replacing of the FAT cache and writes back it in the storage medium. For example, the file access program PR converts the FAT2 t1 and the discontinuity cluster list t2 into the FAT ft and writes back it in the storage medium in a timing of low load of processing or a timing before a removal of the storage medium.

Figure 20:
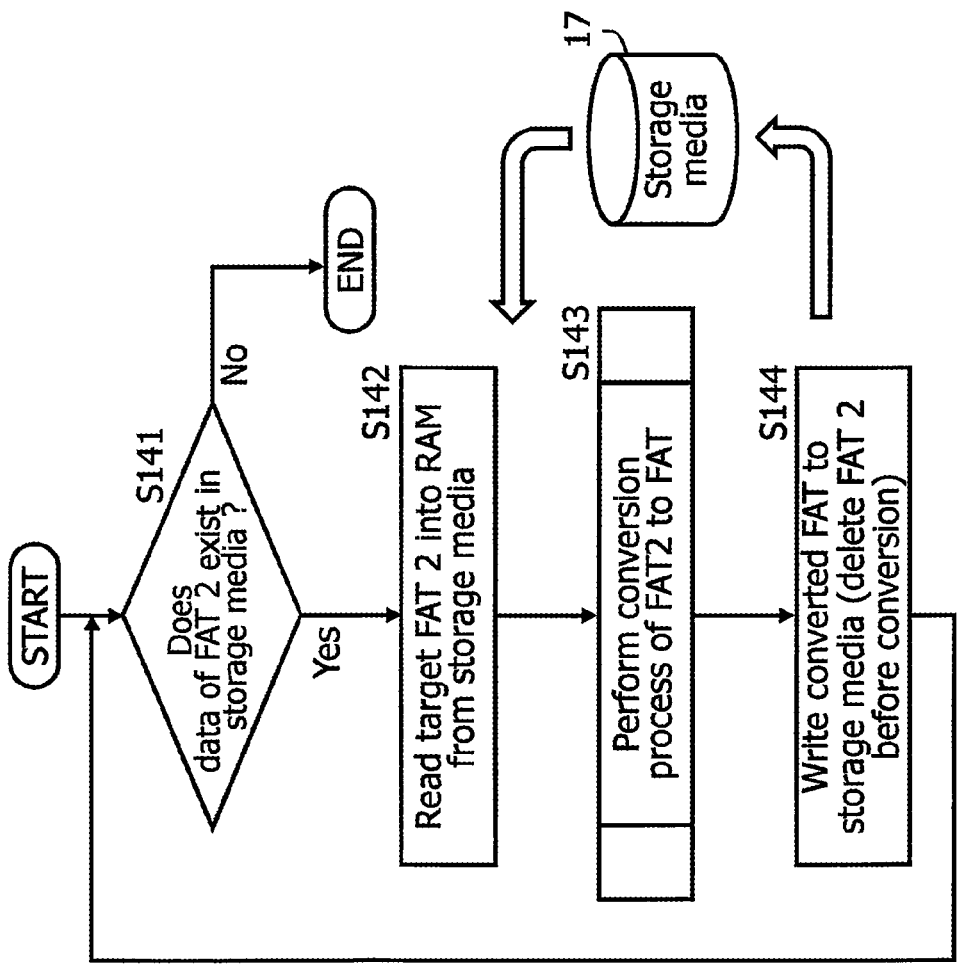
FIG. 20 is a flow diagram explaining the write back processing of the FAT2 t1 and the discontinuous cluster list t2 in the storage medium according to the second embodiment.

FIG. 20 is a flow diagram explaining the write back processing of the FAT2 t1 and the discontinuous cluster list t2 in the storage medium according to the second embodiment. At first, the file access program PR determines whether or not the FAT2 t1 exists on the storage medium (S141). When the FAT2 t1 exists on the storage medium (YES/S141), the file access program PR retrieve the FAT2 t1 to the FAT cache from the storage medium (S142). The file access program PR converts the FAT2 t1 into the FAT ft successively and writes it in the storage medium (S143). In addition, the file access program PR deletes the FAT2 t1 and the discontinuous clusters t2 before the conversion.

In this way, the file access program PR writes back the FAT2 t1 and the discontinuous cluster list t2 in the storage medium into the FAT ft. The file access program PR according to the second embodiment may let the storage medium to store the FAT2 t1 and the discontinuous cluster list t2 until detecting the removal of the storage medium after having mounted the storage medium. In this case, it is possible that the file access program PR reduce the number of times of the conversion processing with FAT2 t1 and the discontinuous cluster list t2 and the FAT ft more.

As above described, the conversion process of the file access program PR according to the second embodiment stores the cluster management table t1, t2 in the first storage area (FAT cache, RAM) 12 into the second storage area (storage medium, secondary storage device) 17, when the cluster management table t1, t2 in the first storage area does not include an entry of the cluster to be accessed, and converts the FAT ft including the entry of the cluster to be accessed in the second storage area 17 into the cluster management table t1, t2, and readout it into the first storage area 12, then reverse converts the cluster management table t1, t2 stored in the second storage area 17 into the FAT ft.

In this way, it is possible that the file access program PR according to the second embodiment accesses the file with a high speed, because conversion processing from the cluster management table t1, t2 to the FAT ft does not carried out in replacing processing of the FAT cache when accessing the file. In addition, it is possible that the file access program PR restores data before the damage based on the cluster management table t1, t2 in the storage medium, when power down of the computer occurs during the update of the data of the file and a part of data is damaged, because the cluster management table t1, t2 are stored in the storage medium 17.

In addition, as same as the first embodiment, because the size of each entry of the first table (FAT2) t1 is small, it is possible that the file access program PR according to the second embodiment improves a cache hit rate and improves the access efficiency of the file. In addition, it is possible that the file access program PR speeds up the search of the cluster and promotes efficiency of the access to a file, because the number of the entries in which the CPU 11 processes at a time increases. In addition, it is possible that the file access program PR according to the embodiment unifies program regardless of the type of the FAT format of the file system and reduces a maintenance man-hour.

(Third Embodiment)

In the third embodiment, an example of a case that the secondary storage device 17, in which the file access program PR accesses, is a fixed secondary storage device 17 which is attached and removed, will be explained. When the attachment and removal of the secondary storage device 17 does not occur, the file access program PR may manage the file only based on the FAT2 t1 and the discontinuous cluster list t2 in the secondary storage device 17. In this case, the file access program PR does not have to convert the FAT2 t1 and the discontinuous cluster list t2 into the FAT ft of the file system of the FAT format.

Figure 21B:
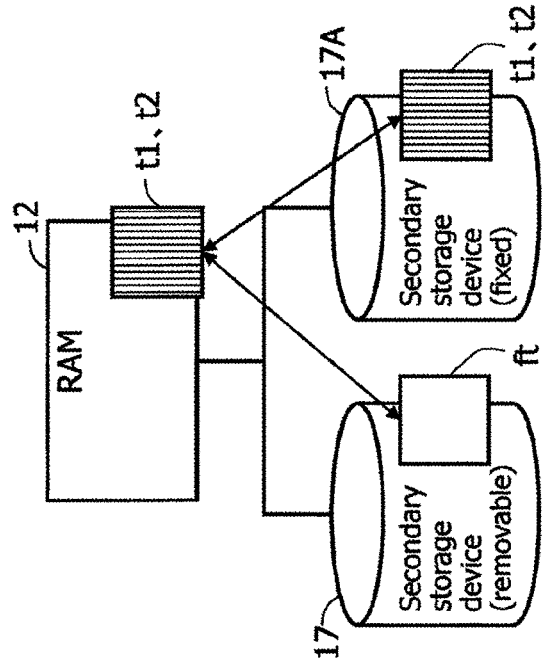
FIG. 21A and FIG. 21B are diagrams explaining a storage place of the FAT2 t1 and the discontinuous cluster list t2 according to the third embodiment.
Figure 21A:
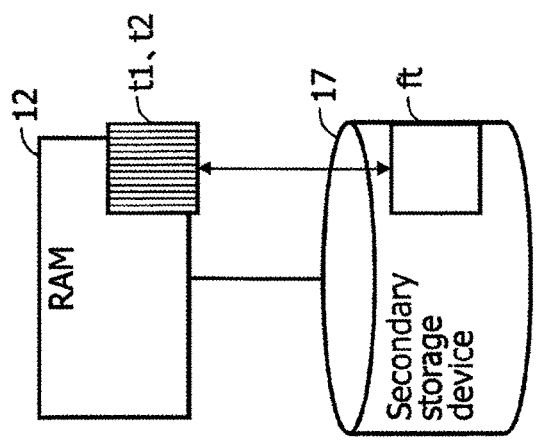

FIG. 21A and FIG. 21B are diagrams explaining a storage place of the FAT2 t1 and the discontinuous cluster list t2 according to the third embodiment. FIG. 21A illustrates the RAM (FAT cache) 12 and the secondary storage device 17 according to the first embodiment. In the first embodiment, the FAT2 t1 and the discontinuous cluster list t2 are stored in the RAM 12 (FAT cache) as illustrated by FIG. 21A. In contrast, in the third embodiment, the FAT2 t1 and the discontinuity cluster list t2 are stored into a fixed the secondary storage device 17A in addition to the RAM 12 as illustrated in FIG. 21B. In addition, because it is not need to assume that the fixed secondary storage device 17A is used by another computer, the fixed secondary storage device 17A in the third embodiment stores only the FAT2 t1 and the discontinuity cluster list t2 and does not store the FAT ft of the file system of the FAT format.

In the third embodiment, the conversion processing with the FAT ft and the FAT2 t1 and the discontinuous cluster list t2 is similar to the processing of the first embodiment. In addition, in the third embodiment, the reading processing of the file from the storage medium (secondary storage device 17) and the writing processing of the file to the storage medium are similar to the processing of the flow chart depicted by FIG. 18 and FIG. 19 in the second embodiment. Therefore, the explanations of these processing are omitted.

As described above, in the file access program PR according to the third embodiment, the cluster management table t1, t2 is stored in the first storage area (FAT cache, RAM) 12 and the second storage area (storage medium, secondary storage device) 17 in which the access speed is lower than the first storage area 12. In addition, the conversion process of the file access program PR, when the cluster management table t1, t2 in the first storage area 12 does not include an entry of the cluster to be accessed, stores the cluster management table t1, t2 in the first storage area 12 into the secondary storage area 17 and reads out the cluster management table t1, t2 including the entry of the cluster to be accessed in the second storage area 17, into the first storage area 12.

Thereby, it is possible that the file access program PR according to the third embodiment accesses the file faster by not processing conversion from the cluster management table t1, t2 to the FAT ft in replacing processing of the FAT cache when accessing the file.

In addition, as same as the first embodiment, because the size of each entry of the first table (FAT2) t1 is small, it is possible that the file access program PR according to the third embodiment improves a cache hit rate and improves the access efficiency of the file. In addition, it is possible that the file access program PR speeds up the search of the cluster and promotes efficiency of the access to a file, because the number of the entries in which the CPU 11 processes at a time increases. In addition, it is possible that the file access program PR according to the embodiment unifies program regardless of the type of the FAT format of the file system and reduces a maintenance man-hour.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A method for file access comprising:
   accessing, by a processor, a file which is divided and stored in data area including a plurality of access units on the base of an access unit management table having a chain information of the access units, the accessing including:
   using a first table included in the access unit management table, the first table including a first management information corresponding to a first access unit and indicating that the first access unit and a second access unit following the first access unit in chains are located in continuous addresses in the data area and a second management information corresponding to the first access unit and indicating that the first access unit and the second access unit are located in discontinuous addresses; and
   using a second table included in the access unit management table, the second table including access unit identification information of the first and the second access units which are located in the discontinuous addresses,
   wherein the accessing includes:
   converting a file allocation table into the access unit management table, the file allocation table corresponding to the plurality of access units and including the access unit identification information of the second access unit as the chain information.

2. The method for file access according to claim 1, wherein the first table includes a third management information corresponding to a third access unit and indicating that the third access unit is a space and a fourth management information corresponding to a fourth access unit and indicating that the fourth access unit stores data of an end of the file.

3. The method for file access according to claim 2, wherein the first table includes the second management information corresponding to a fifth access unit which is different from the first, the second, the third and the fourth access units, and
   the second table includes access unit identification information of the fifth access unit and state information of the fifth access unit.

4. The method for file access according to claim 1, wherein the converting includes:

when detecting an attachment of a storage medium, converting the file allocation table of the detected storage medium into the access unit management table; and when detecting a removal of the storage medium, reverse converting the access unit management table into the file allocation table.

5. The method for file access according to claim 1, wherein the accessing includes:
   storing the access unit management table into a first storage area; and
   storing the file allocation table into a second storage area, an access to the second storage area being slower than an access to the first storage area.

6. The method for file access according to claim 5, wherein the converting includes, when the access unit management table in the first storage area does not include an entry of the access unit to be accessed:
   reverse converting the access unit management table in the first storage area into the file allocation table, and thereafter storing the file allocation table into the second storage area; and
   converting the file allocation table in the second storage area, which includes the entry of the access unit to be accessed, into the access unit management table, and thereafter reading the access unit management table into the first storage area.

7. The method for file access according to claim 5, wherein the converting includes, when the access unit management table in the first storage area does not include an entry of the access unit to be accessed:
   storing the access unit management table in the first storage area into the second storage area;
   converting the file allocation table in the second storage area, which includes the entry of the access unit to be accessed, into the access unit management table, and thereafter reading the access unit management table into the first storage area; and
   reverse converting the access unit management table stored in the second storage area into the file allocation table.

8. The method for file access according to claim 5, wherein the converting including:
   converting entries of the file allocation table of the number of entries of the access unit management table corresponding to a size of the first storage area.

9. The method for file access according to claim 1, wherein the file access process comprising:
   storing the access unit management table into the first storage area and the second storage area, and
   wherein the converting including:
   storing the access unit management table in the first storage area into the second storage area when the access unit management table in the first storage area does not include an entry of the access unit to be accessed; and
   reading the access unit management table in the second storage area, which includes the entry of the access unit to be accessed, into the first storage area.

10. The method for file access according to claim 1, wherein the using the first table comprising:
   writing the first management information in the first table corresponding to the first access unit when writing data of the file into the second access unit which is located in the continuous address with the first access unit; and
   writing the second management information in the first table corresponding to the first access unit and storing the access unit identification information of the first and second access units in the second table when writing the data of the file into the second access unit which is located in the discontinuous address with the first access unit.

11. The method for file access according to claim 1, wherein the file access process comprising, when reading data of the file from the second access unit:
   reading the data from an access unit which is located in the continuous address with the first access unit when the first management information corresponding to the first access unit is stored in the first table; and
   reading data from an access unit corresponding to the access unit identification information of the first access unit by referring to the second table when the second management information corresponding to the first access unit is stored in the first table.

12. The method for file access according to claim 1, wherein a size of each of the first and the second management information included in the first table is 2 bit.

13. The method for file access according to claim 1, wherein a size of the access unit identification information included in the second table is a maximum size among sizes of the access unit identification information included in a plurality of types of the file allocation table.

14. A computer-readable non-transitory tangible recording medium having stored therein a program for causing a computer to execute a file access process, the file access process comprising:
   accessing a file which is divided and stored in data area including a plurality of access units on the base of an access unit management table having a chain information of the access units, the accessing including:
   using a first table included in the access unit management table, the first table including a first management information corresponding to a first access unit and indicating that the first access unit and a second access unit following the first access unit in chains are located in continuous addresses in the data area and a second management information corresponding to the first access unit and indicating that the first access unit and the second access unit are located in discontinuous addresses; and
   using a second table included in the access unit management table, the second table including access unit identification information of the first and the second access units which are located in the discontinuous addresses,
   wherein the accessing includes:
   converting a file allocation table into the access unit management table, the file allocation table corresponding to the plurality of access units and including the access unit identification information of the second access unit as the chain information.

15. The computer-readable non-transitory tangible recording medium according to claim 14, wherein the first table includes a third management information corresponding to a third access unit and indicating that the third access unit is a space and a fourth management information corresponding to a fourth access unit and indicating that the fourth access unit stores data of an end of the file.

16. The computer-readable non-transitory tangible recording medium according to claim 15, wherein the first table includes the second management information corresponding to a fifth access unit which is different from the first, the second, the third and the fourth access units, and the second table includes access unit identification information of the fifth access unit and state information of the fifth access unit.

17. The computer-readable non-transitory tangible recording medium according to claim 14, wherein the using the first table comprising:
   writing the first management information in the first table corresponding to the first access unit when writing data of the file into the second access unit which is located in the continuous address with the first access unit; and
   writing the second management information in the first table corresponding to the first access unit and storing the access unit identification information of the first and second access units in the second table when writing the data of the file into the second access unit which is located in the discontinuous address with the first access unit.

18. The computer-readable non-transitory tangible recording medium according to claim 14, wherein the file access process comprising, when reading data of the file from the second access unit:
   reading the data from an access unit which is located in the continuous address with the first access unit when the first management information corresponding to the first access unit is stored in the first table; and
   reading data from an access unit corresponding to the access unit identification information of the first access unit by referring to the second table when the second management information corresponding to the first access unit is stored in the first table.

* * * * *